(12) United States Patent
Mihara et al.

(10) Patent No.: US 6,850,373 B2
(45) Date of Patent: Feb. 1, 2005

(54) ZOOM LENS, AND ELECTRONIC IMAGING SYSTEM USING THE SAME

(75) Inventors: Shinichi Mihara, Tama (JP); Toshihide Nozawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 7 days.

(21) Appl. No.: 10/630,693

(22) Filed: Jul. 31, 2003

(65) Prior Publication Data

US 2004/0027685 A1 Feb. 12, 2004

(30) Foreign Application Priority Data

Aug. 2, 2002 (JP) ........................................ 2002-225619

(51) Int. Cl.$^7$ .............................................. G02B 15/14
(52) U.S. Cl. ........................ 359/676; 359/380; 359/689
(58) Field of Search ................................. 359/680, 681, 359/382, 683, 676, 689, 691

(56) References Cited

U.S. PATENT DOCUMENTS

| | | | | |
|---|---|---|---|---|
| 3,825,315 A | * | 7/1974 | Altman et al. ............... | 250/349 |
| 5,157,550 A | | 10/1992 | Tsuchida et al. ............ | 359/686 |
| 5,668,668 A | | 9/1997 | Shibayama et al. ......... | 359/683 |
| 6,088,169 A | | 7/2000 | Ohno ........................... | 359/682 |
| 2001/0051960 A1 | * | 12/2001 | Kubick et al. ............... | 707/515 |
| 2003/0197952 A1 | * | 10/2003 | Nozawa et al. ............. | 359/689 |

FOREIGN PATENT DOCUMENTS

| | | |
|---|---|---|
| JP | 63-292106 | 11/1988 |
| JP | 3-139607 | 6/1991 |
| JP | 9-211287 | 8/1997 |
| JP | 2000-137164 | 5/2000 |

* cited by examiner

*Primary Examiner*—Ricky Mack
*Assistant Examiner*—Brandi Thomas
(74) *Attorney, Agent, or Firm*—Kenyon & Kenyon

(57) ABSTRACT

The invention relates to a zoom lens that enables an optical path to be easily bent and has high optical specification performance such as a high zoom ratio, a wide-angle arrangement, a small F-number and limited aberrations. The zoom lens comprises, in order from its object side, a lens group A (G1) that comprises a negative lens, a reflecting optical element P for bending the optical path and remains fixed upon zooming, a lens group B (G2) that moves in one direction alone upon zooming from the wide-angle end to the telephoto end of the zoom lens and an aperture stop S that remains immovable with respect to position upon zooming. The zoom lens satisfies condition (1) with respect to the degree of change in the magnification of the lens group B from the wide-angle end to the telephoto end.

20 Claims, 24 Drawing Sheets

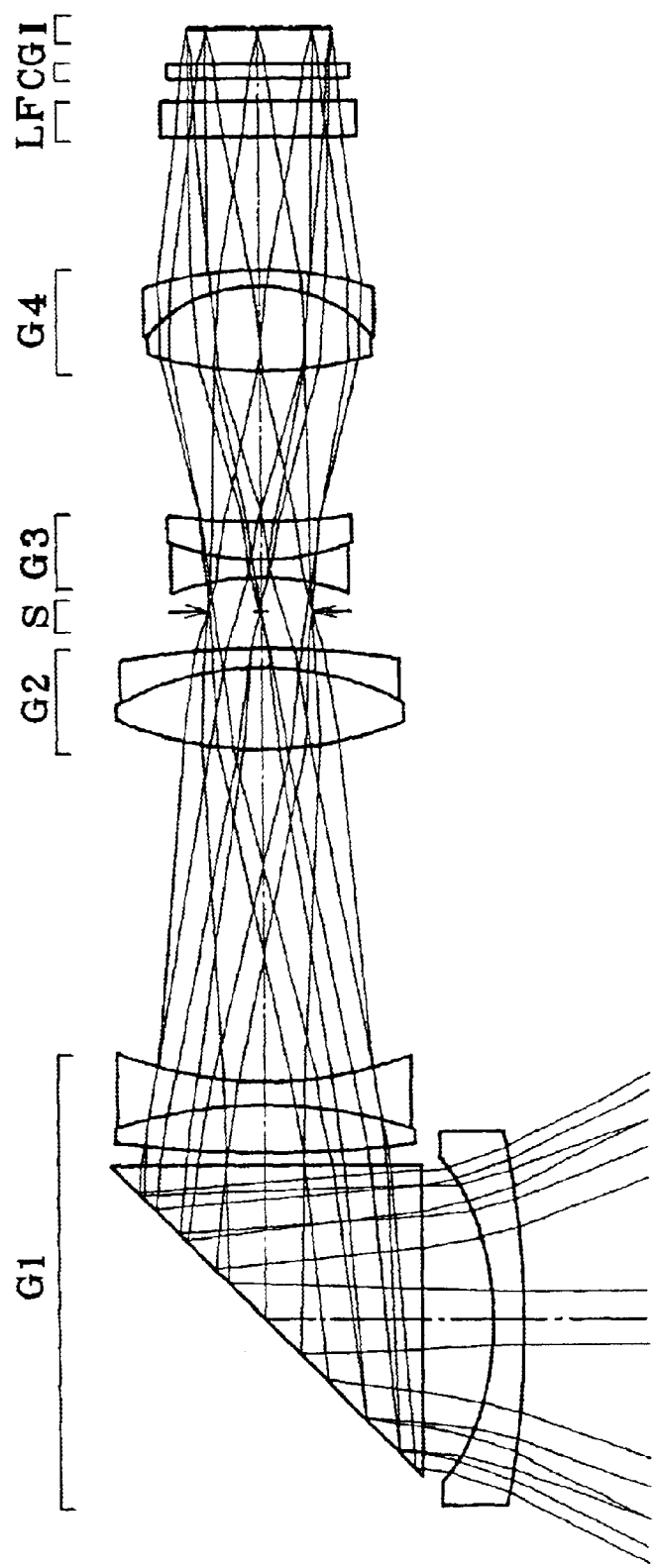

C : Cyan   M : Magenta
Ye : Yellow   G : Green

ZOOM LENS, AND ELECTRONIC IMAGING SYSTEM USING THE SAME

This application claims benefits of Japanese Application No. 2002-225619 filed in Japan on Aug. 2, 2002, the contents of which are incorporated herein by this reference.

BACKGROUND OF THE INVENTION

The present invention relates generally to a zoom lens and an electronic imaging system using the same, and more particularly to a zoom lens, the depth dimension of which is diminished by providing some contrivance to an optical system portion such as a zoom lens, and an electronic imaging system using the same, for instance, a video or digital camera.

In recent years, digital cameras (electronic cameras) have received attention as the coming generation of cameras, an alternative to silver-halide 35 mm-film (135 format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while high image quality is ensured, and which are easy to handle. The gravest bottleneck in diminishing the depth dimension of cameras is the thickness of an optical system, especially a zoom lens system from the surface located nearest to its object side to an image pickup plane.

To make use of a collapsible lens mount that allows the optical system to be taken out of a camera body for phototaking and received therein for carrying now becomes mainstream. Typical examples of an optical system that can effectively be slimmed down while relying on the collapsible lens mount are disclosed in:

JP-A 11-194274
JP-A 11-287953
JP-A 2000-9997

These optical systems comprise two lens groups, i.e., in order from their object sides, a lens group having negative refracting power and a lens group having positive refracting power, both of which move upon zooming.

SUMMARY OF THE INVENTION

The present invention provides a zoom lens comprising, in order from its object side, a lens group A that comprises a negative lens and a reflecting optical element for bending an optical path and remains fixed upon zooming, a lens group B that moves in one direction alone upon zooming from the wide-angle end to the telephoto end of the zoom lens, and an aperture stop that remains immovable with respect to position upon zooming, characterized by satisfying condition (1):

$$0.45 < \log \gamma_B / \log \gamma < 0.85 \tag{1}$$

where $\gamma = f_T/f_W$, and $\gamma_B$ is the magnification of the lens group B at the telephoto end/the magnification of the lens group B at the wide-angle end, provided that $f_W$ and $f_T$ are the focal lengths of the zoom lens at the wide-angle end and the telephoto end, respectively.

Why the aforesaid arrangement is used in the present invention, and how it works is now explained.

To accomplish the aforesaid object, the present invention provides a zoom lens comprising, in order from its object side, a lens group A that comprises a negative lens and a reflecting optical element for bending an optical path and remains fixed upon zooming, a lens group B that moves in one direction alone upon zooming from the wide-angle end to the telephoto end of the zoom lens, and an aperture stop that remains immovable with respect to position upon zooming.

By locating the reflecting optical element for bending an optical path in the lens group A positioned nearest to the object side of the zoom lens and fixing the lens group having a bending function to avoid mechanical complexity upon zooming, it is thus possible to slim down a camera in its depth direction. To obtain a camera that is extremely diminished in thickness in its depth direction, care must be taken in such a way that a lens barrel does not become thick in the diametrical direction of the zoom lens from an optical path-bending site toward the image side of the zoom lens. For instance, as a stop mechanism (that, in some cases, includes a shutter mechanism) moves simultaneously with zooming, a light quantity control mechanism, too, moves with it. This requires some extra moving space, making the lens barrel thick in the diametrical direction.

In the present invention, therefore, the stop mechanism remains immovable with respect to position upon zooming.

However, when the aperture stop is fixed on the object side with respect to the lens group that, upon zooming, moves in one direction and contributes significantly to zooming, there is a problem that the amount of changes in the F-number from the wide-angle end to the telephoto end becomes considerably large. Accordingly, the lens group contributing to zooming, i.e., the lens group B that moves in one direction alone upon zooming from the wide-angle end to the telephoto end must be positioned at least on the object side with respect to the aperture stop that remains immovable with respect to position. As the amount of movement of the lens group B becomes large, the entrance pupil becomes too deep to bend the optical path or satisfy telecentric capability on the exit side. Thus, there is no option but to limit the degree of change in the magnification of the lens group B from the wide-angle end to the telephoto end to the range defined by condition (1).

$$0.45 < \log \gamma_B / \log \gamma < 0.85 \tag{1}$$

Here $\gamma = f_T/f_W$, and $\gamma_B$ is the magnification of the lens group B at the telephoto end/the magnification of the lens group B at the wide-angle end, wherein $f_W$ and $f_T$ are the focal lengths of the zoom lens at the wide-angle end and the telephoto end, respectively.

As the upper limit of 0.85 to condition (1) is exceeded, the entrance pupil becomes too deep, often offering an obstacle to the bending of the optical path and making the exit side telecentric. As the lower limit of 0.45 is not reached, it is impossible to obtain any high zoom ratio. The zoom ratio may be compensated for by the lens group(s) in the rear of the aperture stop; however, the more the amount of compensation, the larger the amount of changes in the F-number from the wide-angle end to the telephoto end becomes. It is here noted that given a certain compensation, the amount of changes in the F-number is limited; that is, it is preferable to locate the lens group that moves in one direction alone upon zooming from the wide-angle end to the telephoto end (the lens group taking part in zooming) on the image side with respect to the aperture stop.

More preferably, $$0.5 < \log \gamma_B / \log \gamma < 0.8 \tag{1}'$$

Most preferably, $$0.55 < \log \gamma_B / \log \gamma < 0.77 \quad (1)''$$

In this connection, it is noted that when the lens group A has negative refracting power, the lens group B should have positive refracting power, whereas when the lens group A has positive refracting power, the lens group B should have negative refracting power. In the latter case, the zoom lens includes between the aperture stop and the image side a lens group C having positive refracting power and a lens group D having positive refracting power as viewed along the optical path. Upon zooming from the wide-angle end to the telephoto end, the lens group D moves toward the image side alone for compensation of the zoom ratio. The former case will be explained later. The lens group B on the object side with respect to the aperture stop and the lens group C on the image side with respect to the aperture stop have refracting powers of opposite signs.

In the present invention, the desired space can be ensured by the bending of the optical path; in some cases, however, the entrance pupil becomes deep or it is difficult to obtain any desired zoom ratio. For this reason, the reflecting optical element for the bending of the optical path should preferably be formed of a prism block that satisfies the following medium condition:

$$1.55 < n_{pri} < 1.97 \quad (2)$$

where $n_{pri}$ is the d-line refractive index of the medium when the reflecting optical element for the bending of the optical path in the lens group A is a prism.

Falling below the lower limit of 1.55 to condition (2) is unfavorable for correction of aberrations, and often incurs an increase in the size of the optical element on the object side, inclusive of the prism. In addition, the composite magnification of the lens group B and the subsequent lens groups becomes low, resulting in an increase in the amount of movement of the lens group B or difficulty in ensuring high zoom ratios. As the upper limit of 1.97 is exceeded, the prism costs much.

More preferably, $$1.65 < n_{pri} < 1.95 \quad (2)'$$

Most preferably, $$1.75 < n_{pri} < 1.93 \quad (2)''$$

The lens group A should preferably comprise a subgroup A1 comprising a negative meniscus lens convex on its object side, a reflecting optical element for bending an optical path, and a subgroup A2 comprising at least a positive lens.

For correction of off-axis aberrations such as chromatic aberrations and distortions, the subgroup A2 should preferably consist of two lenses, i.e., a negative lens and a positive lens in order from its object side and satisfy the following condition.

$$0.5 < d/L < 1.2 \quad (3)$$

Here d is the axial distance of the prism block in the lens group A as measured from the entrance surface to the exit surface and calculated on an air basis, and L is the diagonal length of a (substantially rectangular) effective image pickup area of the image pickup device.

Exceeding the upper limit of 1.2 to condition (3) is unfavorable for correction of aberrations, and often incurs an increase in the size of the optical element on the object side, inclusive of the prism. In addition, the composite magnification of the lens group B and the subsequent lens groups becomes low, resulting in an increase in the amount of movement of the lens group B or difficulty in ensuring high zoom ratios. As the lower limit of 0.5 is not reached, a light beam contributing to the formation of an image at its marginal area does not satisfactorily arrive at the image plane or ghosts tend to occur. If this condition is satisfied, it is then acceptable that the medium before and after reflection is made up of an air surface mirror.

When the optical path is bent in the long and short side directions of the effective screen, the following conditions (3-1) and (3-2) should preferably be satisfied, respectively.

$$0.75 < d/L < 1.1 \quad (3\text{-}1)$$

$$0.55 < d/L < 0.9 \quad (3\text{-}2)$$

Most preferably, $$0.8 < d/L < 1.0 \quad (3\text{-}1)'$$

$$0.6 < d/L < 0.8 \quad (3\text{-}2)'$$

It is here noted that for reducing the size of the optical element on the object side, inclusive of the prism, and correction of aberrations, it is preferable to form the reflecting optical device for the bending of the optical path using a prism medium having a high refractive index.

The zoom lens of the present invention is characterized in that the lens group located nearest to the object side remains fixed upon zooming and the stop position remains immovable as well; however, the most important feature of the zoom lens is that the lens group located nearest to the object side has negative refracting power with satisfaction of condition (1).

When the lens group A located nearest to the object side as viewed along the optical path has negative refracting power, the lens group B should have positive refracting power. In this case, too, it is desired to satisfy condition (1). To cut down the length of the optical system while the amount of movement of each lens group is reduced as much as possible, zooming should preferably be performed in the vicinity of where the composite magnification of the lens group B and the subsequent lens groups is about −1, as represented by the following condition (4). For correction of aberrations, however, the absolute value of that magnification should preferably be low. Accordingly, it is desired to satisfy the following condition (4) at the telephoto end.

$$0.75 < -\beta_{Rt} < 1.5 \quad (4)$$

Here $\beta_{Rt}$ is the composite magnification of the lens group B and the subsequent lens groups at the telephoto end (upon focused on an infinite object point).

Any deviation from the upper limit of 1.5 and the lower limit of 0.75 to condition (4) causes the amount of change in the relative spacing between the respective lens groups to become large, often resulting in an increase in the length of the optical system.

More preferably, $$0.8 < -\beta_{Rt} < 1.3 \quad (4)'$$

Most preferably, $$0.85 < -\beta_{Rt} < 1.15 \quad (4)''$$

In addition, the zoom lens of the present invention should preferably comprise between the aperture stop and the image side a lens group C having negative refracting power and a lens group D having positive refracting power, as viewed along the optical path, wherein upon zooming from the wide-angle end to the telephoto end, at least one of the lens groups moves toward the image side alone, thereby compensating for the zoom ratio.

Since the lens group B located on the object side with respect to the aperture stop and the lens group C on the image side with respect to the aperture stop have refracting powers of opposite signs, they move in the opposite directions upon zooming. It is then preferable to satisfy the following condition (5) with respect to the ratio of $M_3$ to $M_2$.

$$-1.0<M_3/M_2<-0.3 \tag{5}$$

Here $M_2$ and $M_3$ are the amounts of movement of the lens groups B and C, respectively upon zooming from the wide-angle end to the telephoto end when the zoom lens is focused at infinity. The minus sign indicates that the lens groups B and C move in the opposite direction each other.

As the upper limit of −0.3 to condition (5) is exceeded, the entrance pupil becomes too deep, often offering an obstacle to the bending of the optical path and making the exit side telecentric. As the lower limit of −1.0 is not reached, the amount of change in the F-number from the wide-angle end to the telephoto end becomes large.

More preferably, $$-0.9<M_3/M_2<-0.4 \tag{5}'$$

Most preferably, $$-0.85<M_3/M_2<-0.5 \tag{5}''$$

Preferably, focusing should be performed at any of the lens groups located on the image side with respect to the aperture stop.

Upon zooming from the wide-angle end to the telephoto end when the zoom lens is focused at infinity, it is preferable to satisfy the following condition (6) with respect to the ratio of $M_4$ to $M_3$.

$$0.3<M_4/M_3<0.9 \tag{6}$$

Here $M_3$ and $M_4$ are the amounts of movement of the lens groups C and D, respectively, upon zooming from the wide-angle end to the telephoto end when the zoom lens is focused at infinity.

As the upper limit of 0.9 to condition (6) is exceeded, it is difficult to gain any satisfactory zoom ratio, and as the lower limit of 0.3 is not reached, it is difficult to ensure the moving space for focusing.

More preferably, $$0.4<M_4/M_3<0.8 \tag{6}'$$

Most preferably, $$0.5<M_4/M_3<0.7 \tag{6}''$$

As already described, the lens group A should preferably comprise a subgroup A1 comprising a negative meniscus lens convex on its object side, a reflecting optical element for the bending of the optical path and a subgroup A2 comprising at least one positive lens. It is particularly preferable that the subgroup A1 consists of one lens and aberrations such as chromatic aberrations are corrected at the subgroup A2. To correct the zoom lens for off-axis aberrations such as chromatic aberrations and distortions, the subgroup A2 in the lens group A should preferably consist of two lenses, i.e., a positive lens and a negative lens in order from its object side and satisfy the following condition.

$$-0.3<L/f_{12}<0 \tag{7}$$

Here $f_{12}$ is the focal length of the subgroup A2 in the lens group A.

As the upper limit of 0 to condition (7) is exceeded, the composite magnification of the lens group B and the subsequent lens groups becomes low, resulting in an increase in the amount of movement of the lens group B or difficulty in ensuring high zoom ratios. Falling below the lower limit of −0.3 often incurs an increase in the size of the optical element on the object side, inclusive of the prism, and is unfavorable for correction of aberrations as well.

More preferably, $$-0.2<L/f_{12}<0 \tag{7}'$$

Most preferably, $$-0.1<L/f_{12}<0 \tag{7}'$$

A reflecting optical element for bending an optical path such as one used herein requires a constant length of optical path, and so the entrance pupil tends to become deep. In addition, the focal length of the lens group B and the subsequent lens groups must be increased to ensure magnification, taking up much moving space. Since both are mutually contradictory, it is preferable to divide the negative refracting power of the lens group A into two powers, which are then dispersed to before and after the reflecting optical element for the bending of the optical path. It is then preferable to satisfy the following conditions.

$$0.5<(R_{11F}+R_{11R})/(R_{11F}-R_{11R})<4.5 \tag{8}$$

$$0<f_{11}/f_{12}<0.8 \tag{9}$$

Here $R_{11F}$ and $R_{11R}$ are the axial radii of curvature of the object side-surface and the image side-surface of the negative lens in the subgroup A1 in the lens group A, respectively, and $f_{11}$, and $f_{12}$ are the focal lengths of the subgroups A1 and A2 in the lens group A, respectively.

Condition (8) is provided to define the shape factor of the negative lens in the subgroup A1. As the upper limit of 4.5 to this condition (8) is exceeded, the negative lens is likely to interfere with the reflecting optical element for the bending of the optical path. To avoid this, there is no option but to increase the depth dimensions of the camera. As the lower limit of 0.5 is not reached, it is difficult to make correction for aberrations such as distortions.

Condition (9) is provided to define the focal length ratio between the subgroups A1 and A2. As the upper limit of 0.8 is exceeded, the entrance pupil is likely to become deep, and as the lower limit of 0 is not reached, the focal length of the lens group B and the subsequent lens groups must be increased to ensure the magnification, taking up much moving space.

More preferably, the following conditions (8)' and/or (9)' should be satisfied.

$$0.8<(R_{11F}+R_{11R})/(R_{11F}-R_{11R})<3.5 \tag{8}'$$

$$0<f_{11}/f_{12}<0.8 \tag{9}''$$

Even more preferably, the following conditions (8)''or (9)'' should be satisfied.

$$1.0<(R_{11F}+R_{11R})/(R_{11F}-R_{11R})<2.5 \tag{8}''$$

$$0<f_{11}/f_{12}<0.2 \tag{9}''$$

Most preferably, both conditions (8)" and (9)" should be satisfied.

In any case, it is acceptable to form the reflecting surface in shapes other than plane shape. More preferably, a control system that can freely vary the shape of the reflecting surface is provided to make correction for fluctuations of focal position and aberrations with zooming by means of its transformation or perform focusing or zooming. For this control system, a variable-shape mirror with controllable shape may be used.

Apart from this, it is acceptable to use as the reflecting optical element a prism with a planoconcave lens cemented to its plane portion or a prism whose effective transmitting or reflecting surface is formed of a curved surface. In view of the balance between the level of correction of distortions and the target size of the electronic image pickup device, it is acceptable to locate a positive lens of weak power nearest to the object side of the zoom lens. In that case, the subgroup A2 may be removed from the lens group A. Referring to the subgroup A1 in the lens group A, which is fixed upon zooming, it may be movable because the subgroup A2 is relatively easy to move. In that case, upon zooming the subgroup A2 should preferably move toward the image size in a convex locus.

For size reductions of lens systems it is important to reduce the number of lenses and the thickness of each lens element. However, this results in a loss of the degree of freedom in correction of each Seidel aberration and chromatic aberrations, rendering their correction difficult. To make correction for fluctuations of Seidel aberrations with zooming or off-axis aberration remnants all over the zooming zone, it is effective to introduce aspheric surfaces in all lens groups having positive refracting power. It is particularly preferable to introduce an aspheric surface on a positive lens element. To make correction for longitudinal chromatic aberration and chromatic aberration of magnification all over the zooming zone, it is desired that all lens groups having positive refracting power comprise a cemented lens component. To reduce the number of lenses, it is also desired that all lens groups having positive refracting power be each formed of one single cemented lens component. In the present invention, it is noted that the lens component refers to a single or cemented lens provided that a lens that contact air on its object and image sides along an optical path is taken as one unit.

As described above, the present invention provides means for improving on the image-formation capability of the zoom lens portion while reducing its thickness.

Next, how and why the thickness of filters is reduced is now explained. In an electronic imaging system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance ($\tau_{600}$) of at least 80% at 600 nm and a transmittance ($\tau_{700}$) of up to 8% at 700 nm is introduced between the image pickup device in the rear of the zoom lens system and the object side of the system, the transmittance at a near-infrared area of 700 nm or longer is relatively lower and the transmittance on the red side is relatively higher as compared with those of the absorption type, so that the tendency of bluish purple to turn into magenta—a defect of a CCD or other solid-state image pickup device having a complementary colors mosaic filter—is diminished by gain control and there can be obtained color reproduction comparable to that by a CCD or other solid-state image pickup device having a primary colors filter. The color reproducibility of not only primary colors and complementary colors but also objects having a strong reflectivity in the near-infrared range, like plants and the human skins, are improved.

Thus, it is preferable to satisfy the following conditions (10) and (11):

$$\tau_{600}/\tau_{550} \geq 0.8 \tag{10}$$

$$\tau_{700}/\tau_{550} \leq 0.08 \tag{11}$$

where $\tau_{550}$ is the transmittance at 550 nm wavelength.

More preferably, the following conditions (10)' and/or (11)' should be satisfied:

$$\tau_{600}/\tau_{550} \geq 0.85 \tag{10)'}$$

$$\tau_{700}/\tau_{550} \leq 0.05 \tag{11)'}$$

Even more preferably, the following conditions (10)" or (11)" should be satisfied:

$$\tau_{600}/\tau_{550} \geq 0.9 \tag{10)''}$$

$$\tau_{700}/\tau_{550} \leq 0.03 \tag{11)''}$$

Most preferably, both conditions (13)" and (14)" should be satisfied:

Another defect of the CCD or other solid-state image pickup device is that the sensitivity to the wavelength of 550 nm in the near ultraviolet area is considerably higher than that of the human eye. This, too, makes noticeable chromatic blurring at the edges of an image due to chromatic aberrations in the near ultraviolet range. Such color blurring is fatal to a compact optical system. Accordingly, if an absorber or reflector is inserted on the optical path, which is designed such that the ratio of the transmittance ($\tau_{400}$) at 400 nm wavelength to that ($\tau_{550}$) at 550 nm wavelength is less than 0.08 and the ratio of the transmittance ($\tau_{440}$) at 440 nm wavelength to that ($\tau_{550}$) at 550 nm wavelength is greater than 0.4, it is then possible to considerably reduce noises such as chromatic blurring while the wavelength range necessary for color reproduction (satisfactory color reproduction) is kept intact.

It is thus preferable to satisfy the following conditions (12) and (13):

$$\tau_{400}/\tau_{550} \leq 0.08 \tag{12}$$

$$\tau_{440}/\tau_{550} \geq 0.4 \tag{13}$$

More preferably, the following conditions (12)' and/or (13)' should be satisfied.

$$\tau_{400}/\tau_{550} \leq 0.06 \tag{12)'}$$

$$\tau_{440}/\tau_{550} \geq 0.5 \tag{13)'}$$

Even more preferably, the following condition (12)" or (13)" should be satisfied.

$$\tau_{400}/\tau_{550} \leq 0.04 \tag{12)''}$$

$$\tau_{440}/\tau_{550} \geq 0.6 \tag{13)''}$$

Most preferably, both condition (12)" and (13)" should be satisfied.

It is noted that these filters should preferably be located between the image-formation optical system and the image pickup device.

On the other hand, a complementary colors filter is higher in substantial sensitivity and more favorable in resolution than a primary colors filter-inserted CCD due to its high transmitted light energy, and provides a great merit when used in combination with a small-size CCD.

To shorten and slim down the optical system, the optical low-pass filter that is another filter, too, should preferably be thinned as much as possible. In general, an optical low-pass filter harnesses a double-refraction action that a uniaxial crystal like berg crystal has. However, when the optical low-pass filter includes a quartz optical low-pass filter or filters in which the angles of the crystal axes with respect to the optical axis of the zoom lens are in the range of 35° to 55° and the crystal axes are in varying directions upon projected onto the image plane, the filter having the largest thickness along the optical axis of the zoom lens among them should preferably satisfy the following condition (14) with respect to its thickness $t_{LPF}$ (mm).

$$0.08 < t_{LPF}/a < 0.16 \text{ (at } a < 4 \,\mu\text{m)}$$

$$0.075 < t_{LPF}/a < 0.15 \text{ (at } a < 3 \,\mu\text{m)} \quad (14)$$

Here $t_{LPF}$ (mm) is the thickness of the optical low-pass filter having the largest thickness along the optical axis of the zoom lens with the angle of one crystal axis with respect to the optical axis being in the range of 35° to 55°, and a is the horizontal pixel pitch (in $\mu$m) of the image pickup device.

Referring to a certain optical low-pass filter or an optical low-pass filter having the largest thickness among optical low-pass filters, its thickness is set in such a way that contrast becomes theoretically zero at the Nyquist threshold wavelength, i.e., at approximately a/5.88 (mm). A thicker optical low-pass filter may be effective for prevention of swindle signals such as moiré fringes, but makes it impossible to take full advantages of the resolving power that the electronic image pickup device has, while a thinner filter renders full removal of swindle signals like moiré fringes impossible. However, swindle signals like moiré fringes have close correlations with the image-formation capability of a taking lens like a zoom lens; high image-formation capability renders swindle signals like moiré fringes likely to occur. Accordingly, when the image-formation capability is high, the optical low-pass filter should preferably be somewhat thicker whereas when it is low, the optical low-pass filter should preferably be somewhat thinner.

As the pixel pitch becomes small, on the other hand, the contrast of frequency components greater than the Nyquist threshold decreases due to the influence of diffraction by the image-formation lens system and, hence, swindle signals like moiré fringes are reduced. Thus, it is preferable to reduce the thickness of the optical low-pass filter by a few % or a few tens % from a/5.88 (mm) because a rather improved contrast is obtainable at a spatial frequency lower than the frequency corresponding to the Nyquist threshold.

More preferably, $$0.075 < t_{LPF}/a < 0.15 \text{ (at } a < 4 \,\mu\text{m)}$$

$$0.07 < t_{LPF}/a < 0.14 \text{ (at } a < 3 \,\mu\text{m)} \quad (14)'$$

Most preferably, $$0.07 < t_{LPF}/a < 0.14 \text{ (at } a < 4 \,\mu\text{m)}$$

$$0.065 < t_{LPF}/a < 0.13 \text{ (at } a < 3 \,\mu\text{m)} \quad (14)''$$

If an optical low-pass filter is too thin at a<4 $\mu$m, it is then difficult to process. Thus, it is permissible to impart some thickness to the optical low-pass filter or make high the spatial frequency (cutoff frequency) where contrast reduces down to zero even when the upper limit to conditions (14), (14)' and (14)'' is exceeded. In other words, it is permissible to regulate the angle of the crystal axis of the optical low-pass filter with respect to the optical axis of the zoom lens to within the range of 15° to 35° or 55° to 75°. In some cases, it is also permissible to dispense with the optical low-pass filter. In that angle range, the quantity of separation of incident light to an ordinary ray and an extraordinary ray is smaller than that around 45°, and that separation does not occur at 0° or 90° (at 90°, however, there is a phase difference because of a velocity difference between both rays—the quarter-wave principle).

As already described, when the pixel pitch becomes small, it is difficult to increase the F-number because the image-formation capability deteriorates under the influence of diffraction at a high spatial frequency that compensates for such a small pixel pitch. It is thus acceptable to use two types of aperture stops for a camera, i.e., a full-aperture stop where there is a considerable deterioration due to geometric aberrations and an aperture stop having an F-number in the vicinity of diffraction limited. It is then acceptable to dispense with such an optical low-pass filter as described before.

Especially when the pixel pitch is small and the highest image-formation capability is obtained at a full-aperture stop, etc., it is acceptable to use an aperture stop having a constantly fixed inside diameter as means for controlling the size of an incident light beam on the image pickup plane instead of using an aperture stop having a variable inside diameter or a replaceable aperture stop. Preferably in that case, at least one of lens surfaces adjacent to the aperture stop should be set such that its convex surface is directed to the aperture stop and it extends through the inside diameter portion of the aperture stop, because there is no need of providing any additional space for the stop, contributing to length reductions of the zoom optical system. It is also desirable to locate an optical element having a transmittance of up to 90% (where possible, the entrance and exit surfaces of the optical element should be defined by planar surfaces) in a space including the optical axis at least one lens away from the aperture stop or use means for replacing that optical element by another element having a different transmittance.

Alternatively, the electronic imaging system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that the illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by a ($\mu$m)/F-number <0.4, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

It is understood that when the relation of the full-aperture F-number at the wide-angle end to the pixel pitch a ($\mu$m) used satisfies F>a, it is acceptable to dispense with the optical low-pass filter. In other words, it is permissible that the all the medium on the optical axis between the zoom lens system and the electronic image pickup device is composed of air or a non-crystalline medium alone. This is because there are little frequency components capable of producing alias due to deterioration in the image-formation capability by reason of diffraction and geometric aberrations.

It is understood that only the upper limit or only the lower limit may be applied to each of the above conditions, and that the values of these conditions in each of the following examples may be extended as far as the upper or lower limits thereof.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIG. 5 is an optical path diagram for Example 1 of the zoom lens of the invention when the optical path is bent as focused on an infinite object point at the wide-angle end.

FIG. 32 is illustrative of the state of FIG. 29.

DESCRIPTION OF THE PREFERRED EMBODIMENTS

Examples 1 to 4 of the zoom lens are now explained. Sectional lens configurations of these examples at the wide-angle end (a), in the intermediate state (b) and at the telephoto end (c) upon focused on an object point at infinity are shown in FIGS. 1 through 4 wherein G1 represents a first lens group, G2 a second lens group, S a stop, G3 a third lens group, G4 a fourth lens group, LF a low-pass filter, CG a cover glass for a CCD that is an electronic image pickup device, and I the image plane of CCD. P is a plane-parallel plate or the taken-apart optical path-bending prism in the first lens group G1. For the near-infrared sharp cut coat, for instance, it is acceptable to use another near-infrared absorption filter, a transparent plane plate with a near-infrared sharp cut coat applied on the entrance surface or a low-pass filter LF that is directly provided with a near-infrared sharp cut coat.

As typically shown in FIG. 5 that is an optical path diagram for Example 1 of the zoom lens of the invention when the optical path is bent upon focused on an infinite object point at the wide angle end, the optical path-bending prism P is configured in the form of a reflecting prism that bends the optical path through 90°. In Examples 1–4, the aspect ratio of the effective image pickup area is 3:4 and the optical path is bent in the lateral direction.

EXAMPLE 1

Figure 1A:
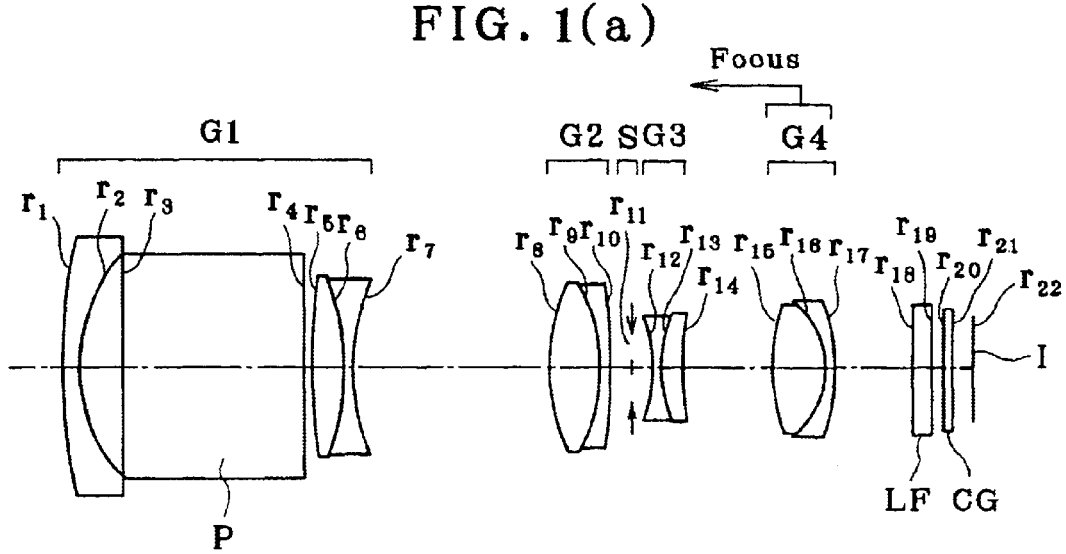
FIGS. 1(a), 1(b) and 1(c) are sections in schematic illustrative of Example 1 of the zoom lens of the invention at the wide-angle end (a), in an intermediate state (b) and at the telephoto end (c), respectively, when the zoom lens is focused on an object point at infinity.
Figure 1B:
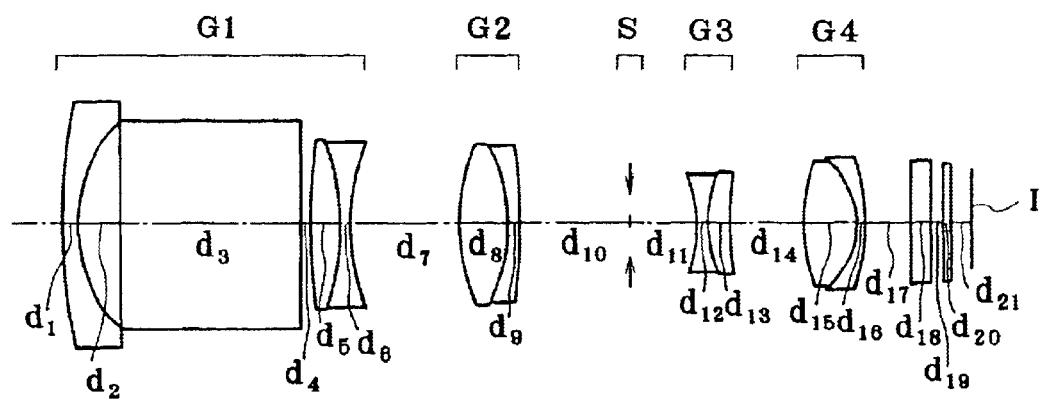
Figure 1C:
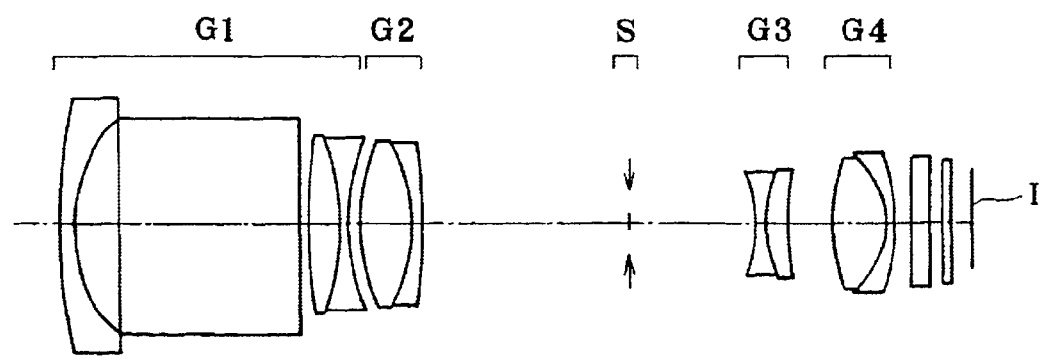

As shown in FIGS. 1(a), 1(b) and 1(c), Example 1 is directed to a zoom lens made up of a first lens group G1 composed of a negative meniscus lens element convex on its object side, an optical path-bending prism P and a doublet consisting of a double-convex positive lens and a double-concave negative lens, a second lens group G2 composed solely of a doublet consisting of a double-convex positive lens and a negative meniscus lens concave on its object side, an aperture stop S, a third lens group G3 composed solely of a doublet consisting of a double-concave negative lens and a negative meniscus lens convex on its object side, and a fourth lens group G4 composed solely of a doublet consisting of a double-convex positive lens and a negative meniscus lens concave on its object side. Upon zooming from the wide-angle end to the telephoto end of the zoom lens, the second lens group G2 moves toward the object side of the zoom lens, the third lens group G3 moves toward the image plane side of the zoom lens and the fourth lens group G4 moves toward the image plane side with a narrowing spacing with the third lens group G3 while the first lens group G1 and the aperture stop S remain fixed. For focusing on a nearby subject, the fourth lens group G4 moves toward the object side.

Three aspheric surfaces are used; one at the object side-surface of the doublet in the first lens group G1, one at the object side-surface of the double-convex positive lens in the second lens group G2, and one at the object side-surface of the double-convex positive lens in the fourth lens group G4.

EXAMPLE 2

Figure 2A:
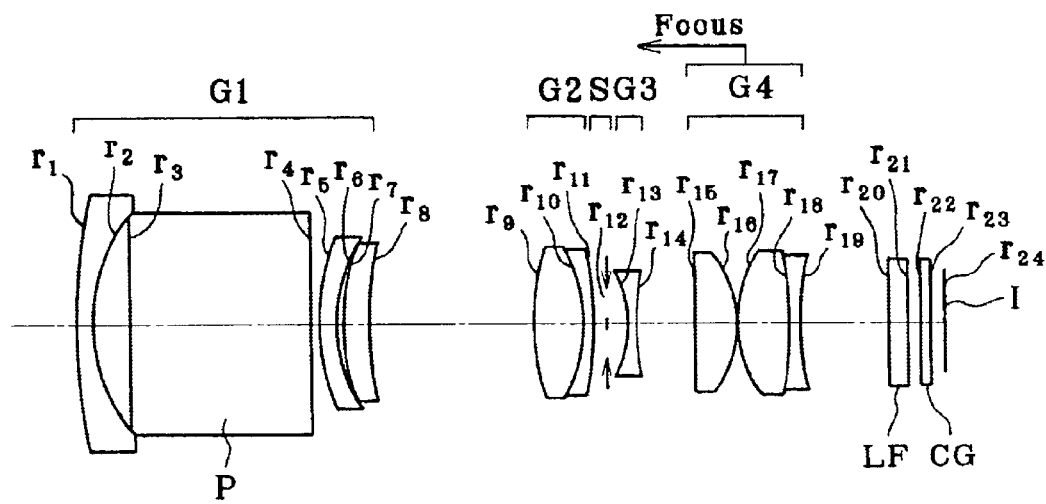
FIGS. 2(a), 2(b) and 2(c) are sections in schematic illustrative of Example 2 of the zoom lens, similar to FIGS. 1(a) to 1(c).
Figure 2B:
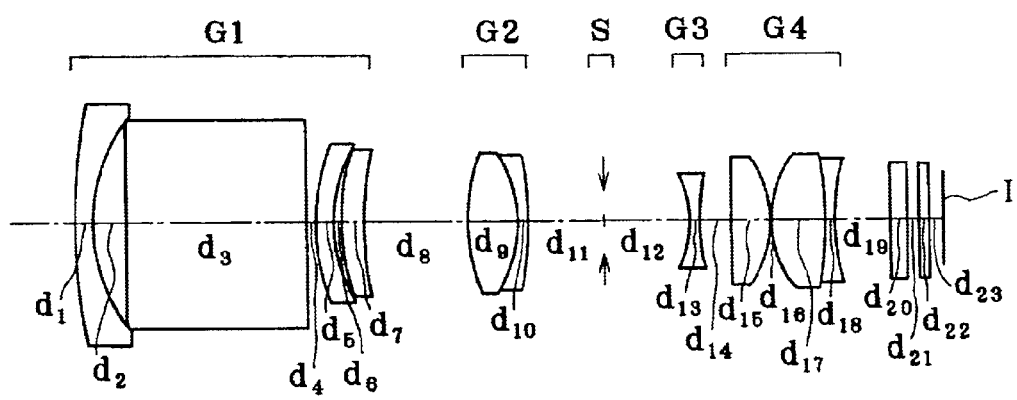
Figure 2C:
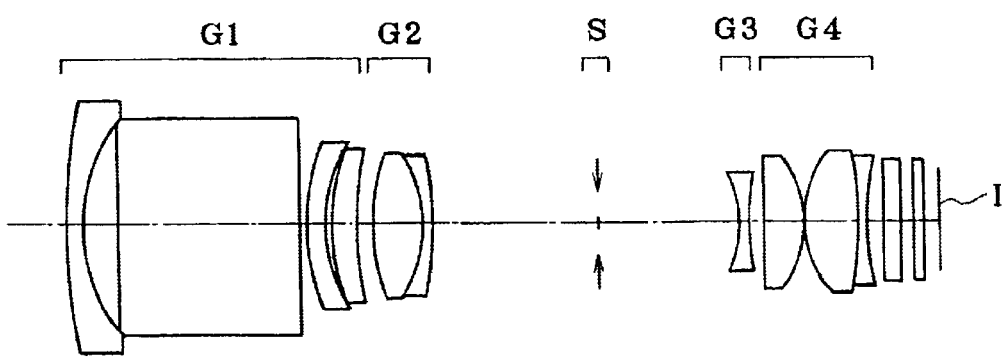

As shown in FIGS. 2(a), 2(b) and 2(c), Example 2 is directed to a zoom lens made up of a first lens group G1 composed of a negative meniscus lens convex on its object side, an optical path-bending prism P, a negative meniscus lens convex on its object side and a positive meniscus lens convex on its object side, a second lens group G2 composed solely of a doublet consisting of a double-convex positive lens and a negative meniscus lens concave on its object side, an aperture stop S, a third lens group G3 composed solely of a double-concave negative lens and a fourth lens group G4 composed of a positive meniscus lens concave on its object side and a doublet consisting of a double-convex positive lens and a double-concave negative lens. Upon zooming from the wide-angle end to the telephoto end of the zoom lens, the second lens group G2 moves toward the object side of the zoom lens, the third lens group G3 moves toward the image plane side of the zoom lens and the fourth lens group G4 moves toward the image plane side with a narrowing spacing with the third lens group G3 while the first lens group G1 and the aperture stop S remain fixed. For focusing on a nearby subject, the fourth lens group G4 moves toward the object side.

Three aspheric surfaces are used; one at the image plane side-surface of the negative meniscus lens just after the optical path-bending prism P in the first lens group G1, one at the object side-surface of the double-convex positive lens in the first lens group G2, and one at the image plane side-surface of the positive meniscus lens in the fourth lens group G4.

EXAMPLE 3

Figure 3A:
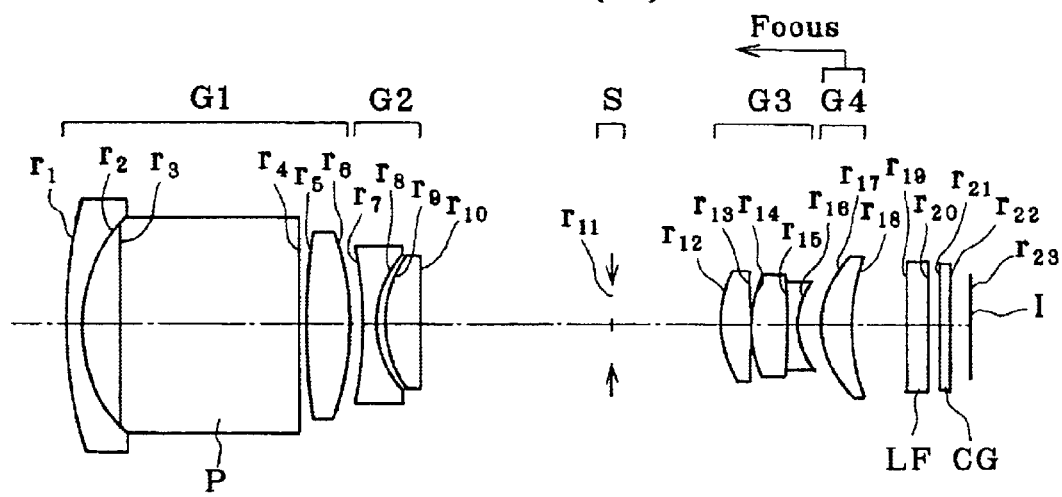
FIGS. 3(a), 3(b) and 3(c) are sections in schematic illustrative of Example 3 of the zoom lens, similar to FIGS. 1(a) to 1(c).
Figure 3B:
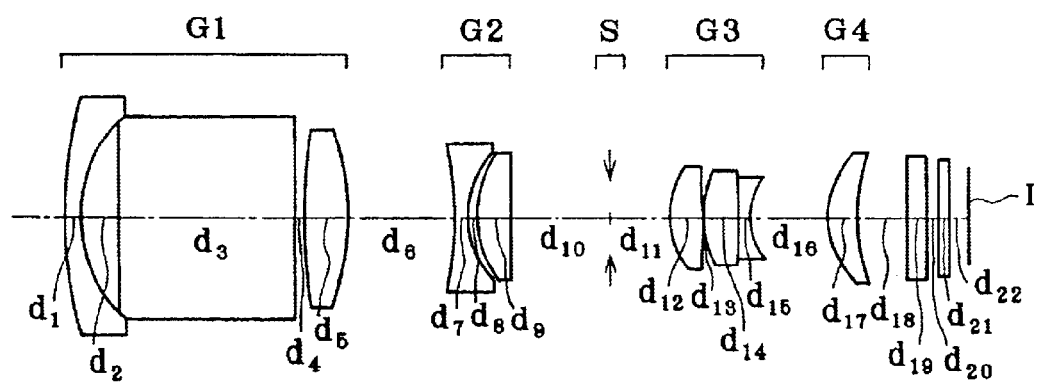
Figure 3C:
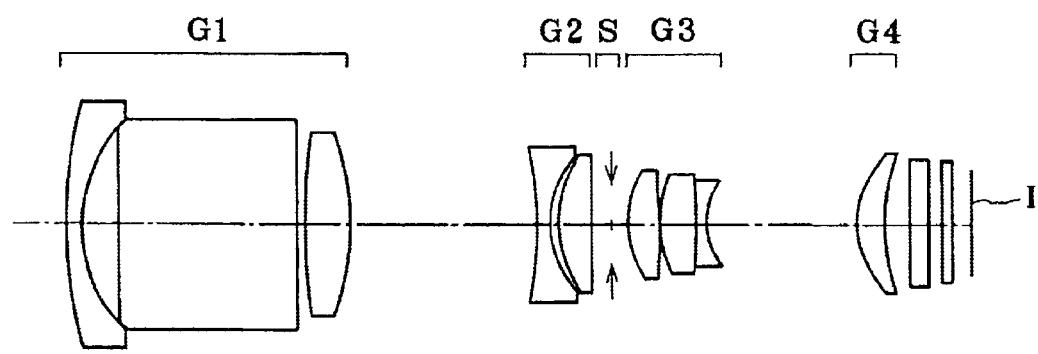

As shown in FIGS. 3(a), 3(b) and 3(c), Example 3 is directed to a zoom lens made up of a first lens group G1 composed of a negative meniscus lens convex on its object side, an optical path-bending prism P and a double-convex positive lens, a second lens group G2 composed of a double-concave negative lens and a positive meniscus lens convex on its object side, an aperture stop S, a third lens group G3 composed of a double-convex positive lens and a doublet consisting of a double-convex positive lens and a double-concave negative lens and a fourth lens group G4 composed solely of a positive meniscus lens convex on its object side. Upon zooming from the wide-angle end to the telephoto end of the zoom lens, the second lens group G2 moves toward the image plane side of the zoom lens, the third lens group G3 moves toward the object side of the zoom lens and the fourth lens group G4 moves toward the image plane side while the first lens group G1 and the aperture stop S remain fixed. For focusing on a nearby subject, the fourth lens group G4 moves toward the object side.

Four aspheric surfaces are used; one at the image plane side-surface of the double-concave negative lens in the second lens group G2, two at both surfaces of the single lens, i.e., the double-convex positive lens in the third lens group G3 and one at the object side-surface of the positive meniscus lens in the fourth lens group G4.

EXAMPLE 4

Figure 4A:
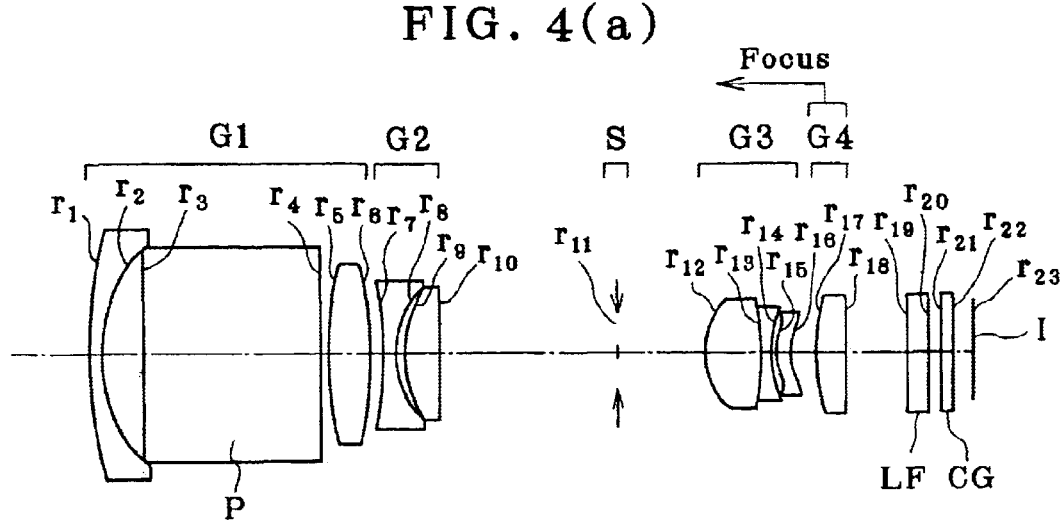
FIGS. 4(a), 4(b) and 4(c) are sections in schematic illustrative of Example 4 of the zoom lens, similar to FIGS. 1(a) to 1(c).
Figure 4B:
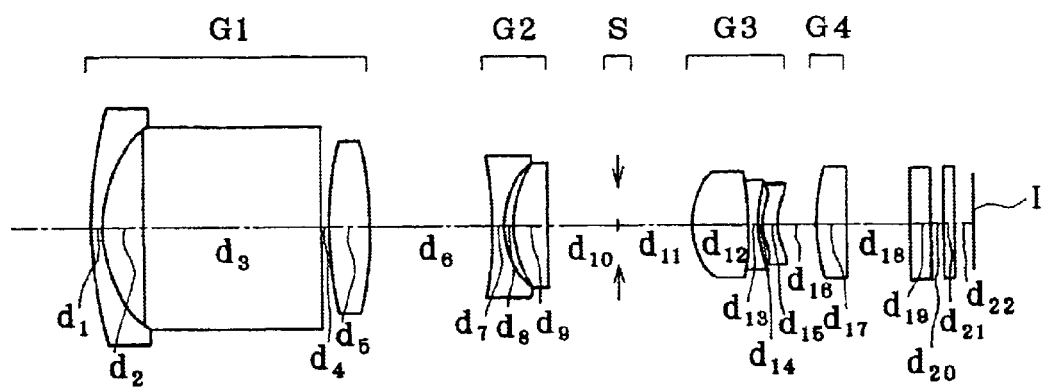
Figure 4C:
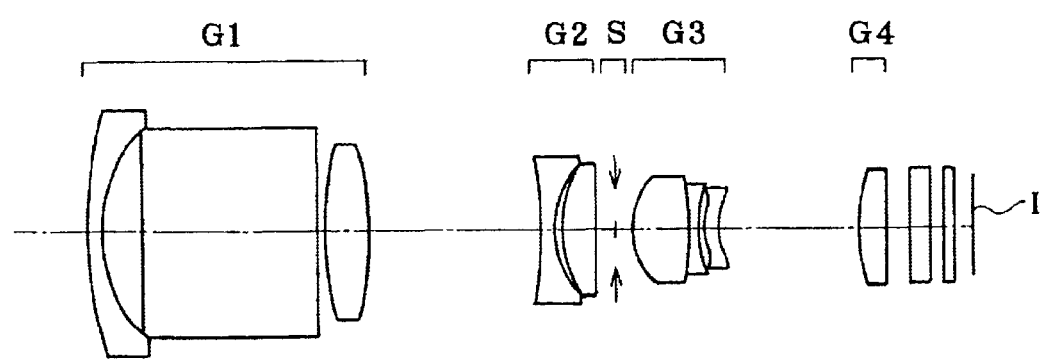
Figure 6A:
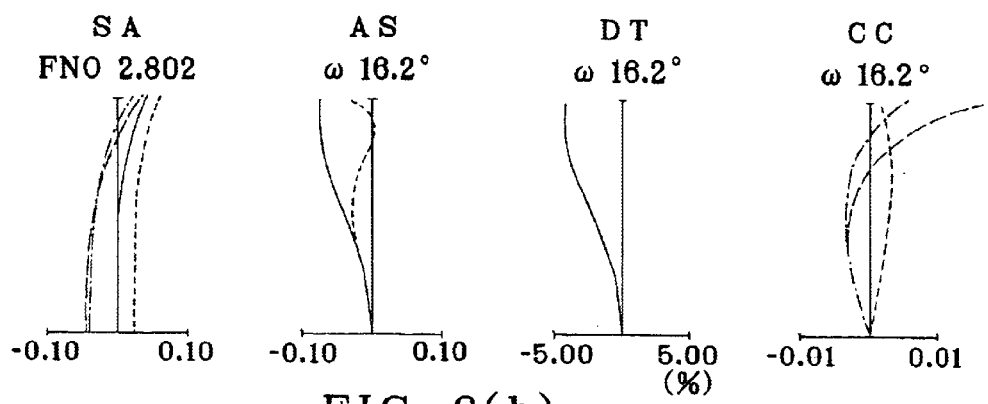
FIGS. 6(a), 6(b) and 6(c) are aberration diagrams for Example 1 upon focused on an object point at infinity.
Figure 6B:
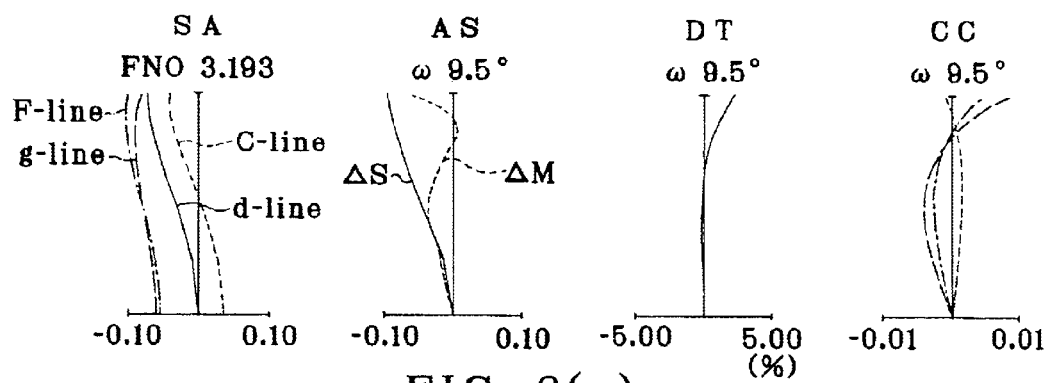
Figure 6C:
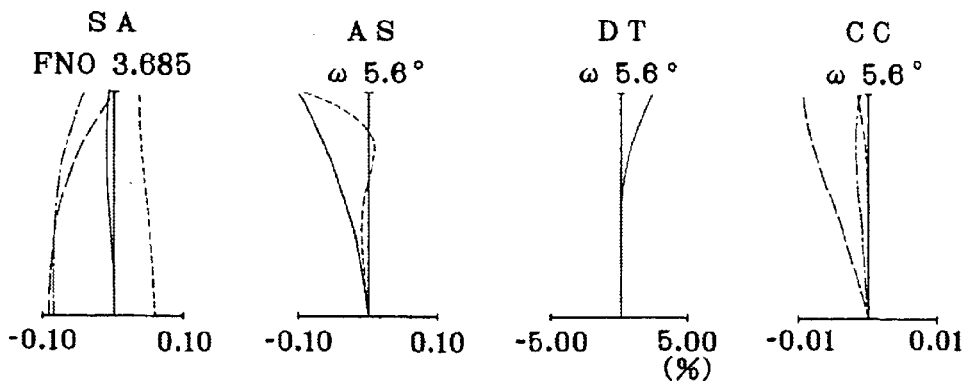
Figure 7A:
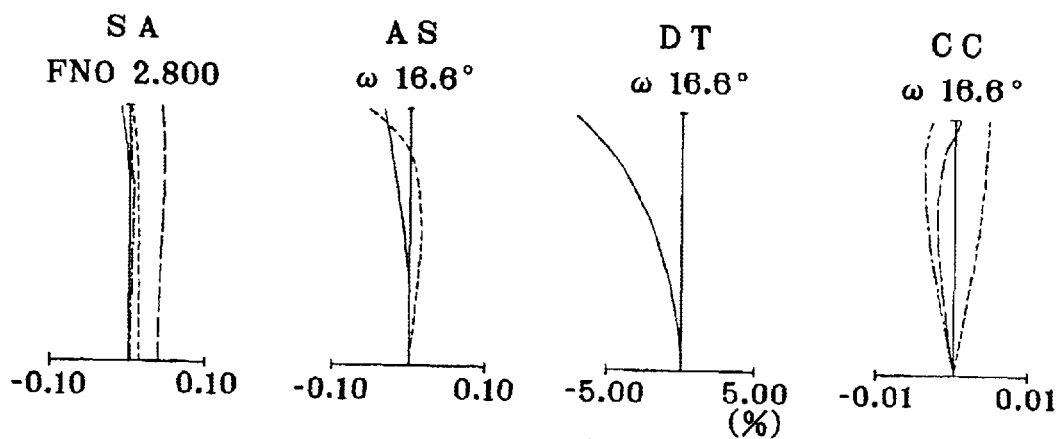
FIGS. 7(a), 7(b) and 7(c) are aberration diagrams for Example 2 upon focused on an object point at infinity.
Figure 7B:
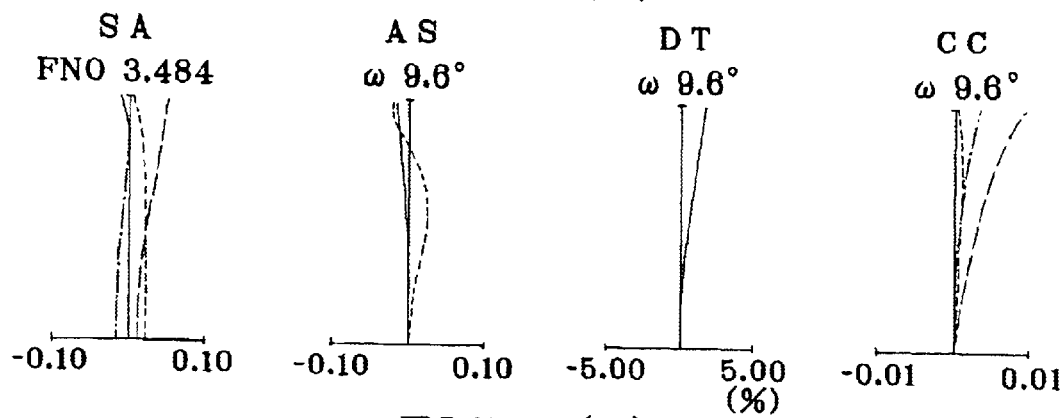
Figure 7C:
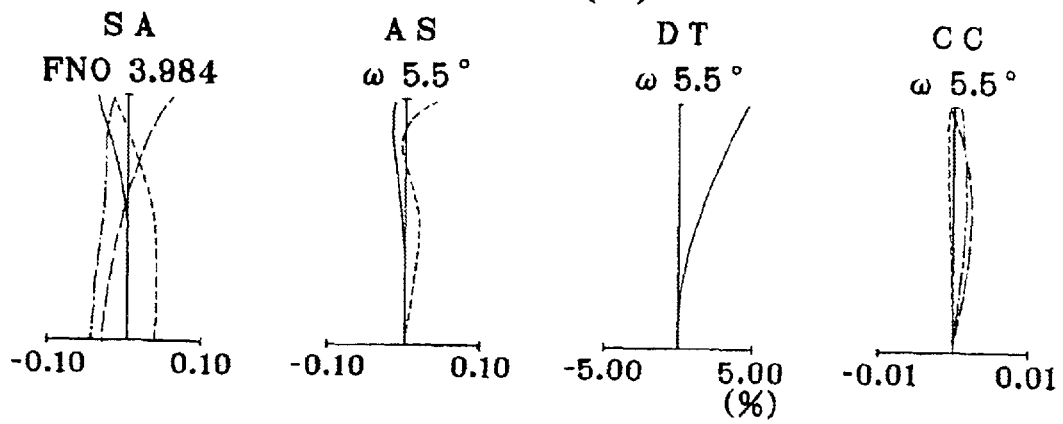
Figure 8A:
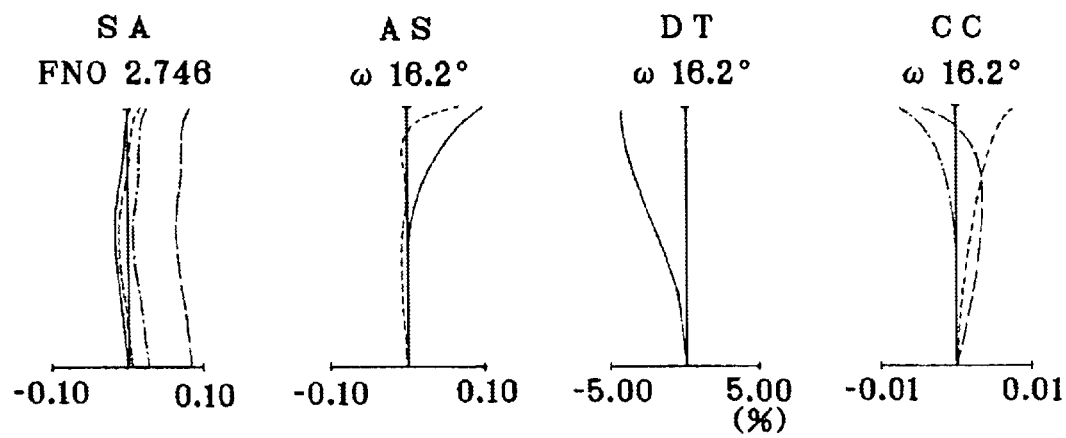
FIGS. 8(a), 8(b) and 8(c) are aberration diagrams for Example 3 upon focused on an object point at infinity.
Figure 8B:
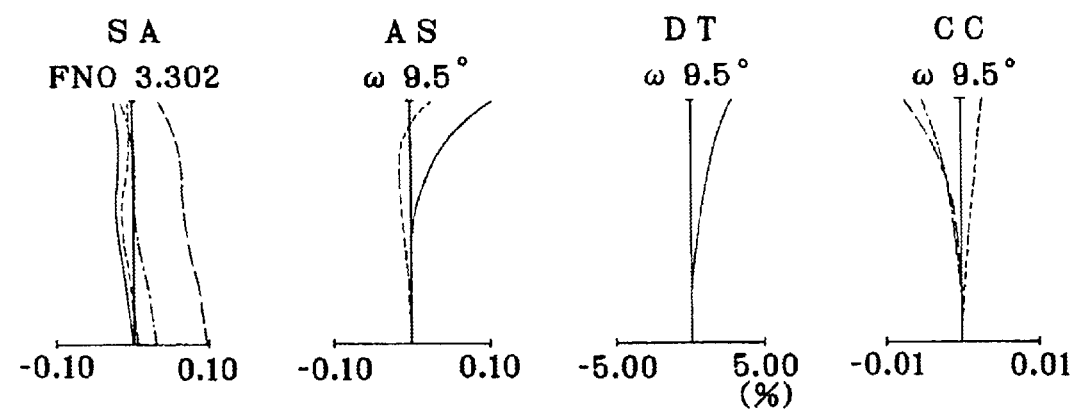
Figure 8C:
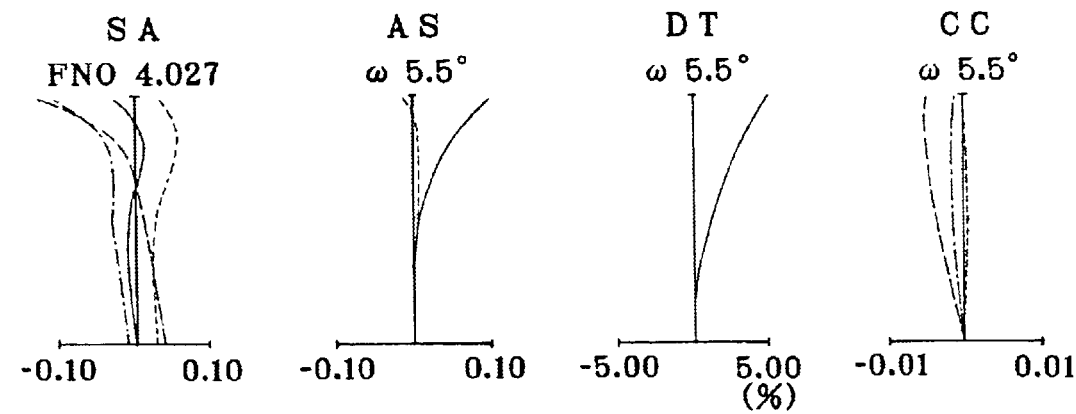
Figure 9A:
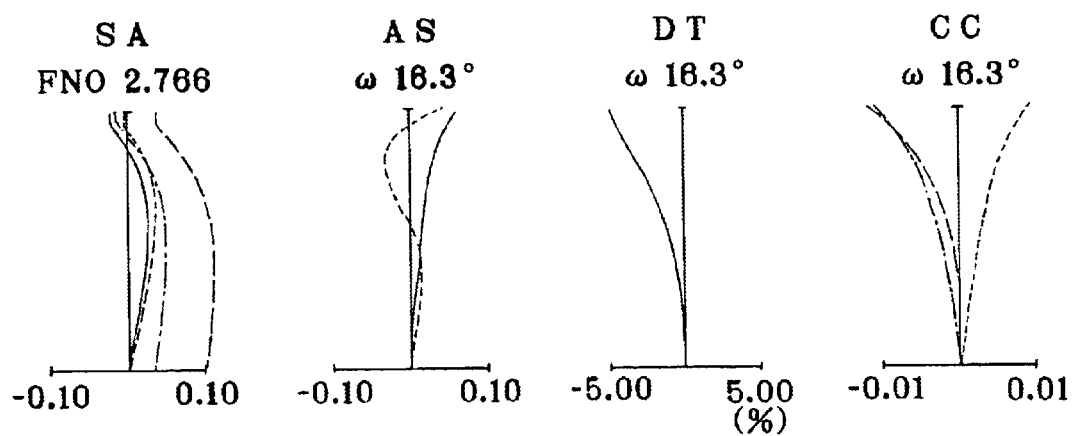
FIGS. 9(a), 9(b) and 9(c) are aberration diagrams for Example 4 upon focused on an object point at infinity.
Figure 9B:
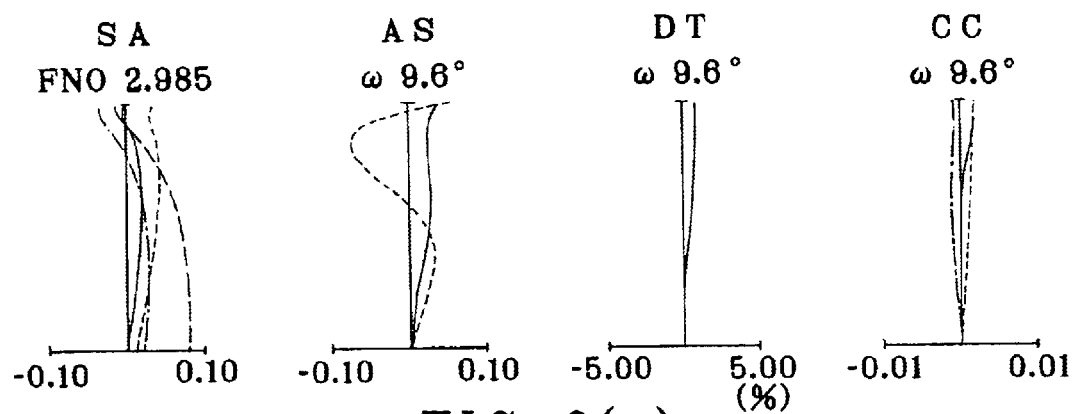
Figure 9C:
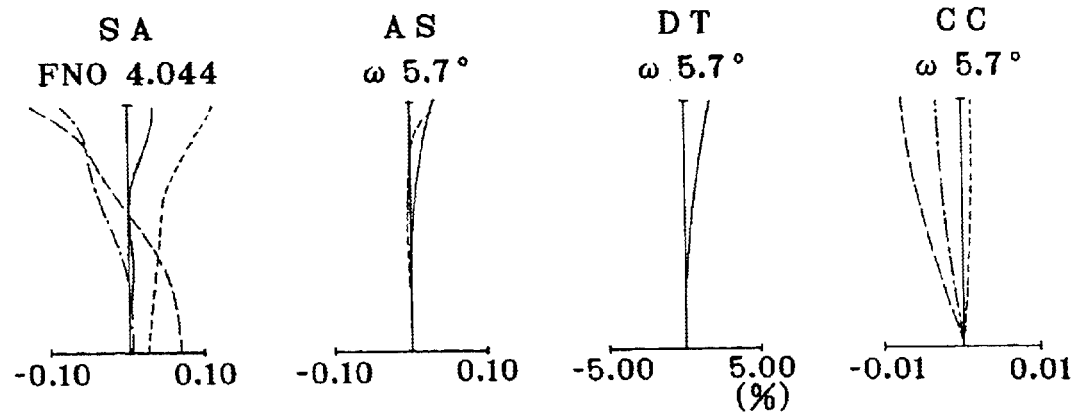

As shown in FIGS. 4(a), 4(b) and 4(c), Example 4 is directed to a zoom lens made up of a first lens group G1 composed of a negative meniscus lens convex on its object side, an optical path-bending prism P and a double-convex positive lens, a second lens group G2 composed of a double-concave negative lens and a double-convex positive lens, an aperture stop S, a third lens group G3 composed of a doublet consisting of a double-convex positive lens and a double-concave negative lens and a negative meniscus lens convex on its object side and a fourth lens group G4 composed solely of a positive meniscus lens convex on its object side. Upon zooming from the wide-angle end to the telephoto end of the zoom lens, the second lens group G2 moves toward the image plane side of the zoom lens, the third lens group G3 moves toward the object side of the zoom lens, and the fourth lens group G4 moves toward the object side, then goes back to the image plane side and comes nearer to the image plane side at the telephoto end than at the wide-angle end, while the first lens group G1 and the aperture stop S remain fixed. For focusing on a nearby subject, the fourth lens group G4 moves toward the object side.

Five aspheric surfaces are used; two at both surfaces of the double-concave negative lens in the second lens group G2, one at the object side-surface of the doublet in the third lens group G3, and two at both surfaces of the single lens, i.e., the negative meniscus lens in the third lens group G3.

The numerical data on each example are given below. Symbols used hereinafter but not hereinbefore have the following meanings:

f: focal length of the zoom lens
$F_{NO}$: F-number
$2\omega$: angle of view
WE: wide-angle end
ST: intermediate state
TE: telephoto end
$r_1, r_2, \ldots$: radius of curvature of each lens surface
$d_1, d_2, \ldots$: spacing between the adjacent lens surfaces
$n_{d1}, n_{d2}, \ldots$: d-line refractive index of each lens element
$\nu_{d1}, \nu_{d2}, \ldots$: Abbe number of each lens element Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4, A_6, A_8$ and $A_{10}$ are the fourth, sixth, eighth and tenth aspheric coefficients, respectively.

EXAMPLE 1

| | | | |
|---|---|---|---|
| $r_1 = 41.8576$ | $d_1 = 1.1000$ | $n_{d1} = 1.74320$ | $\nu_{d1} = 49.34$ |
| $r_2 = 11.0536$ | $d_2 = 3.0000$ | | |
| $r_3 = \infty$ | $d_3 = 12.5000$ | $n_{d2}$ 1.80610 | $\nu_{d2} = 40.92$ |
| $r_4 = \infty$ | $d_4 = 0.4000$ | | |
| $r_5 = 45.3710$ (Aspheric) | $d_5 = 2.2000$ | $n_{d3} = 1.80610$ | $\nu_{d3} = 40.92$ |
| $r_6 = -17.7512$ | $d_6 = 0.7000$ | $n_{d4} = 1.51633$ | $\nu_{d4} = 64.14$ |
| $r_7 = 14.3571$ | $d_7 = $ (Variable) | | |
| $r_8 = 14.3503$ (Aspheric) | $d_8 = 3.5000$ | $n_{d5} = 1.74320$ | $\nu_{d5} = 49.34$ |
| $r_9 = -12.0000$ | $d_9 = 0.7000$ | $n_{d6} = 1.84666$ | $\nu_{d6} = 23.78$ |
| $r_{10} = -45.8572$ | $d_{10} = $ (Variable) | | |
| $r_{11} = \infty$ (Stop) | $d_{11} = $ (Variable) | | |
| $r_{12} = -10.4621$ | $d_{12} = 0.7000$ | $n_{d7} = 1.48749$ | $\nu_{d7} = 70.23$ |
| $r_{13} = 8.5670$ | $d_{13} = 1.6000$ | $n_{d8} = 1.80610$ | $\nu_{d8} = 40.92$ |
| $r_{14} = 26.4156$ | $d_{14} = $ (Variable) | | |
| $r_{15} = 13.3825$ (Aspheric) | $d_{15} = 3.5000$ | $n_{d9} = 1.74320$ | $\nu_{d9} = 49.34$ |
| $r_{16} = -6.0000$ | $d_{16} = 0.7000$ | $n_{d10} = 1.84666$ | $\nu_{d10} = 23.78$ |
| $r_{17} = -14.5742$ | $d_{17} = $ (Variable) | | |
| $r_{18} = \infty$ | $d_{18} = 1.4400$ | $n_{d11} = 1.54771$ | $\nu_{d11} = 62.84$ |
| $r_{19} = \infty$ | $d_{19} = 0.8000$ | | |
| $r_{20} = \infty$ | $d_{20} = 0.6000$ | $n_{d12} = 1.51633$ | $\nu_{d12} = 64.14$ |
| $r_{21} = \infty$ | $d_{21} = 1.3584$ | | |
| $r_{22} = \infty$ (Image Plane) | | | |

Aspherical Coefficients
5 th surface $K = 0$
$A_4 = 1.2258 \times 10^{-5}$
$A_6 = 7.3190 \times 10^{-7}$
$A_8 = -3.7784 \times 10^{-9}$
$A_{10} = 0.0000$ 8 th surface $K = 0$
$A_4 = -5.3259 \times 10^{-6}$
$A_6 = -6.4038 \times 10^{-7}$
$A_8 = 1.8252 \times 10^{-9}$
$A_{10} = 0.0000$ 1 5 th surface $K = 0$
$A_4 = -1.5212 \times 10^{-4}$
$A_6 = -5.5015 \times 10^{-6}$
$A_8 = 1.5406 \times 10^{-7}$
$A_{10} = 0.0000$ Zooming Data ($\infty$)

| | WE | ST | TE |
|---|---|---|---|
| f (mm) | 6.02091 | 10.38642 | 17.98914 |
| $F_{NO}$ | 2.8018 | 3.1929 | 3.6847 |
| $2\omega$ (°) | 32.3° | 19.0° | 11.2° |
| $d_7$ | 13.81034 | 7.49989 | 0.79781 |
| $d_{10}$ | 1.59335 | 7.88812 | 14.60612 |
| $d_{11}$ | 1.39678 | 4.73086 | 8.71101 |
| $d_{14}$ | 6.18478 | 5.03200 | 2.99514 |
| $d_{17}$ | 5.28210 | 3.10678 | 1.15795 |

EXAMPLE 2

| | | | |
|---|---|---|---|
| $r_1 = 45.3203$ | $d_1 = 1.1000$ | $n_{d1} = 1.74320$ | $\nu_{d1} = 49.34$ |
| $r_2 = 11.8037$ | $d_2 = 2.5000$ | | |
| $r_3 = \infty$ | $d_3 = 12.5000$ | $n_{d2} = 1.80610$ | $\nu_{d2} = 40.92$ |
| $r_4 = \infty$ | $d_4 = 0.4000$ | | |
| $r_5 = 16.2211$ | $d_5 = 1.2000$ | $n_{d3} = 1.74330$ | $\nu_{d3} = 49.33$ |
| $r_6 = 9.0671$(Aspheric) | $d_6 = 0.4611$ | | |
| $r_7 = 14.4963$ | $d_7 = 1.8200$ | $n_{d4} = 1.84666$ | $\nu_{d4} = 23.78$ |
| $r_8 = 26.0382$ | $d_8 = $ (Variable) | | |
| $r_9 = 14.0677$(Aspheric) | $d_9 = 3.5782$ | $n_{d5} = 1.69350$ | $\nu_{d5} = 53.20$ |
| $r_{10} = -10.0812$ | $d_{10} = 0.7000$ | $n_{d6} = 1.84666$ | $\nu_{d6} = 23.78$ |
| $r_{11} = -23.3575$ | $d_{11} = $ (Variable) | | |
| $r_{12} = \infty$ (Stop) | $d_{12} = $ (Variable) | | |
| $r_{13} = -8.5467$ | $d_{13} = 0.7000$ | $n_{d7} = 1.49700$ | $\nu_{d7} = 81.54$ |
| $r_{14} = 15.2744$ | $d_{14} = $ (Variable) | | |
| $r_{15} = -1.421 \times 10^4$ | $d_{15} = 2.8906$ | $n_{d8} = 1.58913$ | $\nu_{d8} = 61.28$ |
| $r_{16} = 7.2797$(Aspheric) | $d_{16} = 0.1000$ | | |
| $r_{17} = 7.8321$ | $d_{17} = 3.7517$ | $n_{d9} = 1.48749$ | $\nu_{d9} = 70.23$ |
| $r_{18} = -27.9866$ | $d_{18} = 0.7000$ | $n_{d10} = 1.84666$ | $\nu_{d10} = 23.78$ |
| $r_{19} = 19.9907$ | $d_{19} = $ (Variable) | | |
| $r_{20} = \infty$ | $d_{20} = 1.4400$ | $n_{d11} = 1.54771$ | $\nu_{d11} = 62.84$ |
| $r_{21} = \infty$ | $d_{21} = 0.8000$ | | |
| $r_{22} = \infty$ | $d_{22} = 0.8000$ | $n_{d12} = 1.51633$ | $\nu_{d12} = 64.14$ |
| $r_{23} = \infty$ | $d_{23} = 0.9602$ | | |
| $r_{24} = \infty$ (Image Plane) | | | |

Aspherical Coefficients
6 th surface $K = 0$
$A_4 = -1.4385 \times 10^{-4}$
$A_6 = -1.5962 \times 10^{-6}$
$A_8 = 3.4139 \times 10^{-8}$
$A_{10} = -8.3837 \times 10^{-10}$ 9 th surface $K = 0$
$A_4 = -5.6504 \times 10^{-5}$
$A_6 = 7.1962 \times 10^{-8}$
$A_8 = 5.9510 \times 10^{-9}$
$A_{10} = 0.0000$ 16 th surface $K = 0$
$A_4 = 2.2972 \times 10^{-4}$
$A_6 = 3.0217 \times 10^{-6}$
$A_8 = -1.0499 \times 10^{-7}$
$A_{10} = 5.7830 \times 10^{-9}$ Zooming Data ($\infty$)

-continued

|  | WE | ST | TE |
|---|---|---|---|
| f (mm) | 6.04972 | 10.38530 | 17.99216 |
| $F_{NO}$ | 2.8000 | 3.4840 | 3.9842 |
| $2\omega$ (°) | 33.1° | 19.1° | 11.0° |
| $d_8$ | 11.57476 | 7.09532 | 0.95447 |
| $d_{11}$ | 0.95647 | 5.43485 | 11.57823 |
| $d_{12}$ | 1.43450 | 6.00801 | 9.90933 |
| $d_{14}$ | 4.15447 | 2.21894 | 0.97868 |
| $d_{19}$ | 6.27292 | 3.63457 | 0.97395 |

EXAMPLE 3

$r_1 = 31.4475$  $d_1 = 1.0000$  $n_{d1} = 1.80518$  $v_{d1} = 25.42$
$r_2 = 10.0029$  $d_2 = 2.8000$
$r_3 = \infty$  $d_3 = 12.0000$  $n_{d2} = 1.80610$  $v_{d2} = 40.92$
$r_4 = \infty$  $d_4 = 0.3000$
$r_5 = 40.9109$  $d_5 = 3.1000$  $n_{d3} = 1.77250$  $v_{d3} = 49.60$
$r_6 = -18.5523$  $d_6 = $ (Variable)
$r_7 = -27.7365$  $d_7 = 0.9000$  $n_{d4} = 1.80610$  $v_{d4} = 40.92$
$r_8 = 6.1675$(Aspheric)  $d_8 = 0.6000$
$r_9 = 7.8689$  $d_9 = 2.5000$  $n_{d5} = 1.75520$  $v_{d5} = 27.51$
$r_{10} = 541.9130$  $d_{10} = $ (Variable)
$r_{11} = \infty$ (Stop)  $d_{11} = $ (Variable)
$r_{12} = 6.8303$(Aspheric)  $d_{12} = 2.2000$  $n_{d6} = 1.74320$  $v_{d6} = 49.34$
$r_{13} = -168.3254$(Aspheric)  $d_{13} = 0.1500$
$r_{14} = 10.3767$  $d_{14} = 2.5000$  $n_{d7} = 1.60311$  $v_{d7} = 60.64$
$r_{15} = -100.0000$  $d_{15} = 0.7000$  $n_{d8} = 1.84666$  $v_{d8} = 23.78$
$r_{16} = 4.2552$  $d_{16} = $ (Variable)
$r_{17} = 6.4363$(Aspheric)  $d_{17} = 2.0000$  $n_{d9} = 1.58313$  $v_{d9} = 59.38$
$r_{18} = 16.8235$  $d_{18} = $ (Variable)
$r_{19} = \infty$  $d_{19} = 1.5000$  $n_{d10} = 1.54771$  $v_{d10} = 62.84$
$r_{20} = \infty$  $d_{20} = 0.8000$
$r_{21} = \infty$  $d_{21} = 0.7500$  $n_{d11} = 1.51633$  $v_{d11} = 64.14$
$r_{22} = \infty$  $d_{22} = 1.3596$
$r_{23} = \infty$ (Image Plane)

Aspherical Coefficients
8 th surface $K = 0$
$A_4 = -2.1223 \times 10^{-4}$
$A_6 = -3.9476 \times 10^{-6}$
$A_8 = -2.3492 \times 10^{-7}$
$A_{10} = 0.0000$
12 th surface $K = 0$
$A_4 = -9.9966 \times 10^{-5}$
$A_6 = -4.8770 \times 10^{-6}$
$A_8 = 7.8835 \times 10^{-7}$
$A_{10} = 0.0000$
13 th surface $K = 0$
$A_4 = 1.6853 \times 10^{-4}$
$A_6 = 4.2908 \times 10^{-6}$
$A_8 = 8.3613 \times 10^{-7}$
$A_{10} = 0.0000$
17 th surface $K = 0$
$A_4 = -3.5205 \times 10^{-4}$
$A_6 = -1.4117 \times 10^{-6}$
$A_8 = -1.1635 \times 10^{-7}$
$A_{10} = 0.0000$
Zooming Data ($\infty$)

-continued

|  | WE | ST | TE |
|---|---|---|---|
| f (mm) | 6.00728 | 10.39935 | 17.99830 |
| $F_{NO}$ | 2.7463 | 3.3017 | 4.0273 |
| $2\omega$ (°) | 32.4° | 18.9° | 11.0° |
| $d_6$ | 0.79769 | 7.29414 | 13.01239 |
| $d_{10}$ | 13.61214 | 7.11013 | 1.39751 |
| $d_{11}$ | 7.70485 | 4.37777 | 1.19903 |
| $d_{16}$ | 1.69969 | 5.42936 | 10.44566 |
| $d_{18}$ | 3.74084 | 3.33843 | 1.50064 |

EXAMPLE 4

$r_1 = 32.0016$  $d_1 = 1.0000$  $n_{d1} = 1.75520$  $v_{d1} = 27.51$
$r_2 = 10.0102$  $d_2 = 2.8000$
$r_3 = \infty$  $d_3 = 12.0000$  $n_{d2} = 1.80610$  $v_{d2} = 40.92$
$r_4 = \infty$  $d_4 = 0.3000$
$r_5 = 23.5519$  $d_5 = 3.1000$  $n_{d3} = 1.72916$  $v_{d3} = 54.68$
$r_6 = -24.7555$  $d_6 = $ (Variable)
$r_7 = -21.9861$(Aspheric)  $d_7 = 0.9000$  $n_{d4} = 1.80610$  $v_{d4} = 40.92$
$r_8 = 5.7215$(Aspheric)  $d_8 = 0.6000$
$r_9 = 7.9386$  $d_9 = 2.5000$  $n_{d5} = 1.78470$  $v_{d5} = 26.29$
$r_{10} = -388.5176$  $d_{10} = $ (Variable)
$r_{11} = \infty$ (Stop)  $d_{11} = $ (Variable)
$r_{12} = 5.6674$(Aspheric)  $d_{12} = 4.0000$  $n_{d6} = 1.74320$  $v_{d6} = 49.34$
$r_{13} = -19.0000$  $d_{13} = 0.7000$  $n_{d7} = 1.84666$  $v_{d7} = 23.78$
$r_{14} = 7.7986$  $d_{14} = 0.3000$
$r_{15} = 3.8662$(Aspheric)  $d_{15} = 1.0000$  $n_{d8} = 1.69350$  $v_{d8} = 53.21$
$r_{16} = 3.6817$(Aspheric)  $d_{16} = $ (Variable)
$r_{17} = 13.0325$  $d_{17} = 2.0000$  $n_{d9} = 1.48749$  $v_{d9} = 70.23$
$r_{18} = 201.0398$  $d_{18} = $ (Variable)
$r_{19} = \infty$  $d_{19} = 1.5000$  $n_{d10} = 1.54771$  $v_{d10} = 62.84$
$r_{20} = \infty$  $d_{20} = 0.8000$
$r_{21} = \infty$  $d_{21} = 0.7500$  $n_{d11} = 1.51633$  $v_{d11} = 64.14$
$r_{22} = \infty$  $d_{22} = 1.3599$
$r_{23} = \infty$ (Image Plane)

Aspherical Coefficients
7 th surface $K = 0$
$A_4 = 2.0496 \times 10^{-4}$
$A_6 = -3.4919 \times 10^{-6}$
$A_8 = 7.4208 \times 10^{-9}$
$A_{10} = 0.0000$
8 th surface $K = 0$
$A_4 = -3.6883 \times 10^{-4}$
$A_6 = 3.4613 \times 10^{-6}$
$A_8 = -9.0209 \times 10^{-7}$
$A_{10} = 0.0000$
12 th surface $K = 0$
$A_4 = 5.4882 \times 10^{-4}$
$A_6 = -1.8282 \times 10^{-5}$
$A_8 = 1.6707 \times 10^{-6}$
$A_{10} = 0.0000$
15 th surface $K = 0$
$A_4 = -8.1049 \times 10^{-3}$
$A_6 = -4.3019 \times 10^{-4}$
$A_8 = -3.1973 \times 10^{-5}$
$A_{10} = 0.0000$
16 th surface $K = 0$
$A_4 = -6.4092 \times 10^{-3}$
$A_6 = -7.3362 \times 10^{-4}$ -continued $A_8 = 2.9898 \times 10^{-5}$
$A_{10} = 0.0000$
Zooming Data (∞)

|  | WE | ST | TE |
|---|---|---|---|
| f (mm) | 6.00844 | 10.40337 | 17.99810 |
| $F_{NO}$ | 2.7659 | 2.9849 | 4.0444 |
| 2ω (°) | 32.6° | 19.2° | 11.3° |
| $d_6$ | 0.80018 | 8.47206 | 12.07930 |
| $d_{10}$ | 12.67757 | 5.00686 | 1.39837 |
| $d_{11}$ | 6.26991 | 5.19965 | 1.19782 |
| $d_{16}$ | 1.70036 | 2.60388 | 9.42234 |
| $d_{18}$ | 4.14771 | 4.30945 | 1.49796 |

The aberration diagrams for Examples 1–4 upon focused on an object point at infinity are shown in FIGS. 6–9, in which SA, AS, DT and CC are indicative of spherical aberrations, astigmatisms, distortions and chromatic aberrations of magnification at the wide-angle end (a), in an intermediate state (b) and at the telephoto end (c).

Tabulated below are the values of conditions (1) to (13) as well as the values of a, $t_{LPF}$ and L concerning condition (14) in Examples 1–4.

|  | Example 1 | Example 2 | Example 3 | Example 4 |
|---|---|---|---|---|
| (1) | 0.60560 | 0.57756 | 0.75702 | 0.61047 |
| (2) | 1.80610 | 1.80610 | 1.80610 | 1.80610 |
| (3) | 0.94808 | 0.94808 | 0.91016 | 0.91016 |
| (4) | 0.56208 | 0.79787 | — | — |
| (5) | 0.56385 | 0.62526 | — | — |
| (6) | 0.93560 | 1.06367 | — | — |
| (7) | −0.00648 | −0.05351 | — | — |
| (8) | 1.71767 | 1.70435 | — | — |
| (9) | 0.01821 | 0.15965 | — | — |
| (10) | 1.0 | 1.0 | 1.0 | 1.0 |
| (11) | 0.04 | 0.04 | 0.04 | 0.04 |
| (12) | 0.0 | 0.0 | 0.0 | 0.0 |
| (13) | 1.06 | 1.06 | 1.06 | 1.06 |
| a | 3.5 | 2.5 | 2.0 | 3.0 |
| $t_{LPF}$ | 0.42 | 0.30 | 0.24 | 0.36 |
| L | 7.3 | 7.3 | 7.3 | 7.3 |

Figure 10:
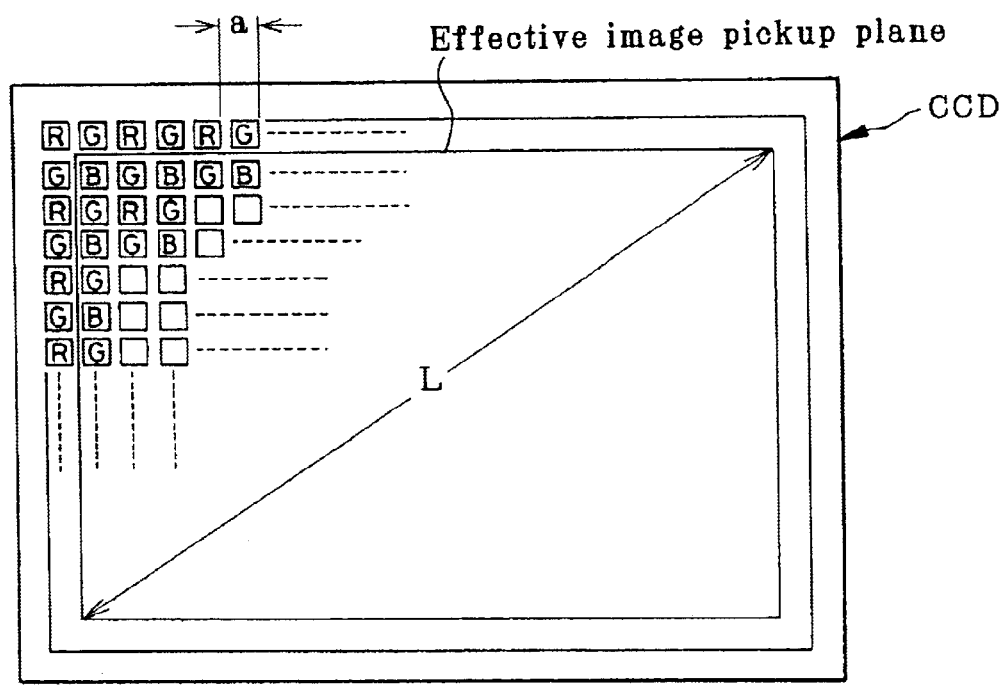
FIG. 10 is illustrative of the diagonal length of the effective image pickup plane of an electronic image pickup device upon phototaking.

Here the diagonal length L of the effective image pickup plane and the pixel spacing a are explained. FIG. 10 is illustrative of one exemplary pixel array for an image pickup device, wherein R (red), G (green) and B (blue) pixels or cyan, magenta, yellow and green (G) pixels (FIG. 13) are mosaically arranged at the pixel spacing a. The "effective image pickup plane" used herein is understood to mean a certain area in the photoelectric conversion surface on an image pickup device used for the reproduction of a photo-taken image (on a personal computer or by a printer). The effective image pickup plane shown in FIG. 10 is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the zoom lens of the present invention is used on an image pickup apparatus having such functions, the diagonal length L of its effective image pickup plane varies. In that case, the diagonal length L of the effective image pickup plane according to the present invention is defined by the maximum value in the widest possible range for L.

On the image side of the final lens group, there is a near-infrared cut filter or an optical low-pass filter LF having a near-infrared cut coat surface on its entrance side. The near-infrared cut filter or near-infrared cut coat surface is designed to have a transmittance of at least 80% at 600 nm wavelength and a transmittance of up to 10% at 700 nm wavelength. More specifically, the near-infrared cut coat surface has a multilayer structure made up of such 27 layers as mentioned below; however, the design wavelength is 780 nm.

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | $TiO_2$ | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | $TiO_2$ | 95.13 | 1.13 |
| 25th layer | $SiO_2$ | 160.97 | 1.20 |
| 26th layer | $TiO_2$ | 99.34 | 1.18 |
| 27th layer | $SiO_2$ | 87.19 | 0.65 |

Air

Figure 11:
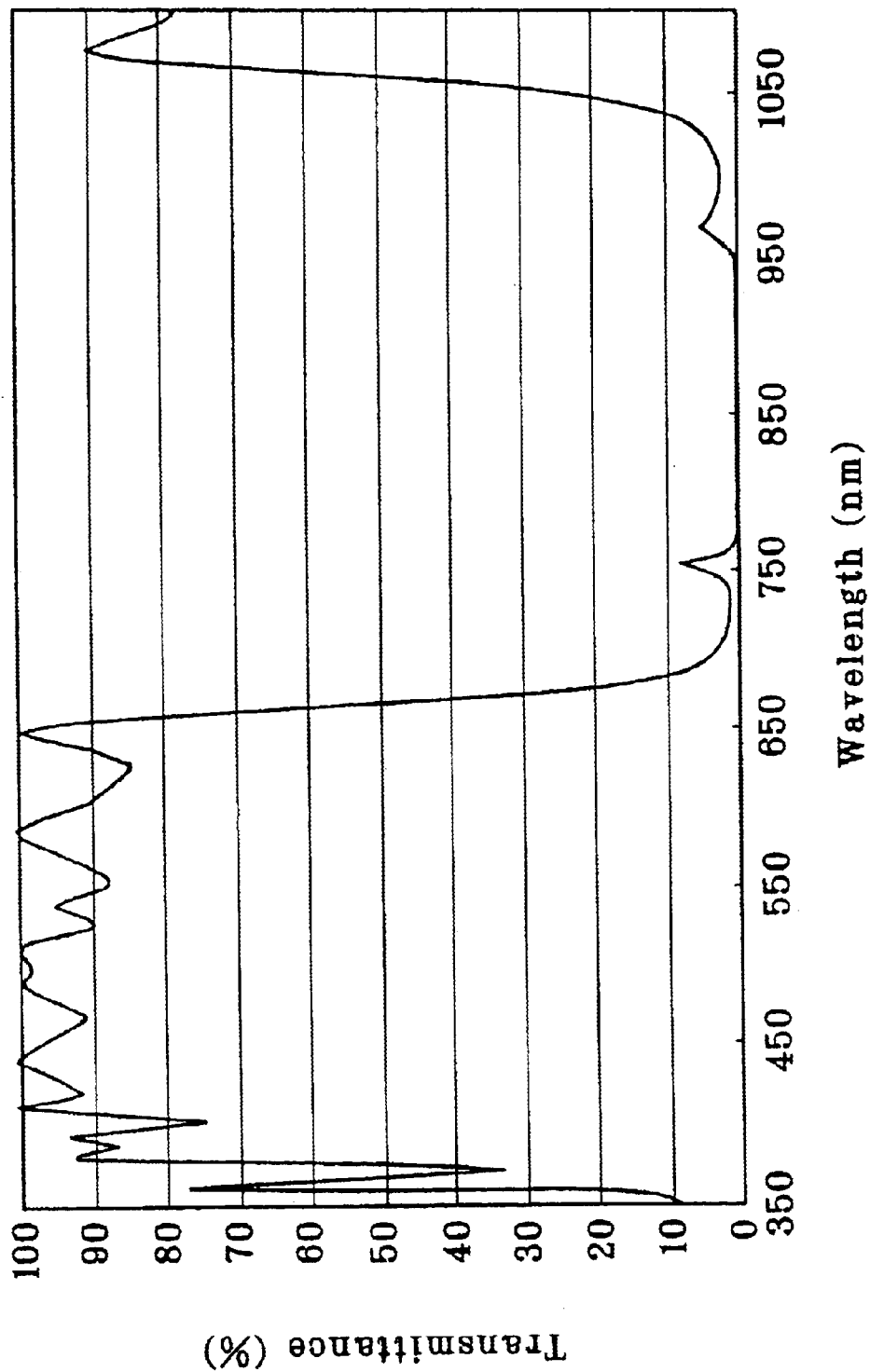
FIG. 11 is a diagram indicative of the transmittance characteristics of one example of the near-infrared sharp cut coat.

The aforesaid near-infrared sharp cut coat has such transmittance characteristics as shown in FIG. 11.

Figure 12:
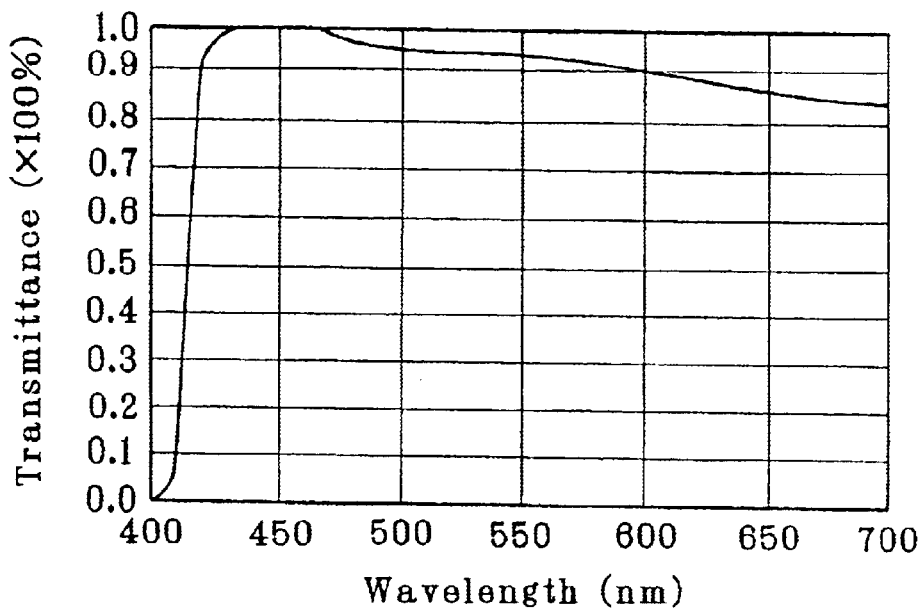
FIG. 12 is a diagram indicative of the transmittance characteristics of one example of the color filter located on the exit surface side of the low-pass filter.

The low-pass filter LF is provided on its exit surface side with a color filter or coat for reducing the transmission of colors at such a short wavelength region as shown in FIG. 12, thereby making the color reproducibility of an electronic image much higher.

Preferably, that filter or coat should be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for image pickup systems using a complementary colors mosaic filter.

In each of the aforesaid examples, coating is applied in such a way that, as shown in FIG. 12, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by a $\mu$m in the horizontal direction and by SQRT(1/2)×a in the ±45° direction for the purpose of moiré control, wherein SQRT means a square root.

Figure 13:
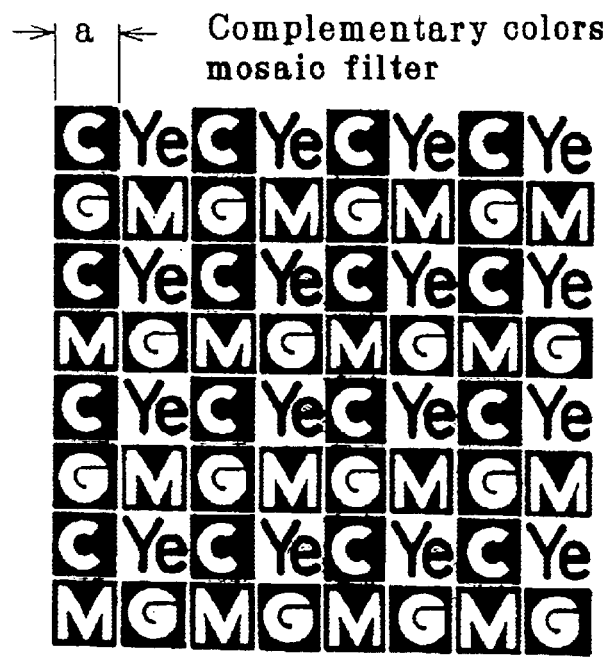
FIG. 13 is a schematic illustrative of how the color filter elements are arranged in the complementary colors mosaic filter.

The image pickup plane I of a CCD is provided thereon with a complementary colors mosaic filter wherein, as shown in FIG. 13, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 13, which should preferably have such characteristics as given below.

Each green color filter element G has a spectral strength peak at a wavelength $G_p$, each yellow filter element $Y_e$ has a spectral strength peak at a wavelength $Y_p$, each cyan filter element C has a spectral strength peak at a wavelength $C_p$, and each magenta filter element M has spectral strength peaks at wavelengths $M_{p1}$, and $M_{p2}$, and these wavelengths satisfy the following conditions.

510 nm<$G_p$<540 nm 5 nm<$Y_p$-$G_p$<35 nm

-100 nm<$C_p$-$G_p$<-5 nm 430 nm<$M_{p1}$<480 nm 580 nm<$M_{p2}$<640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 14:
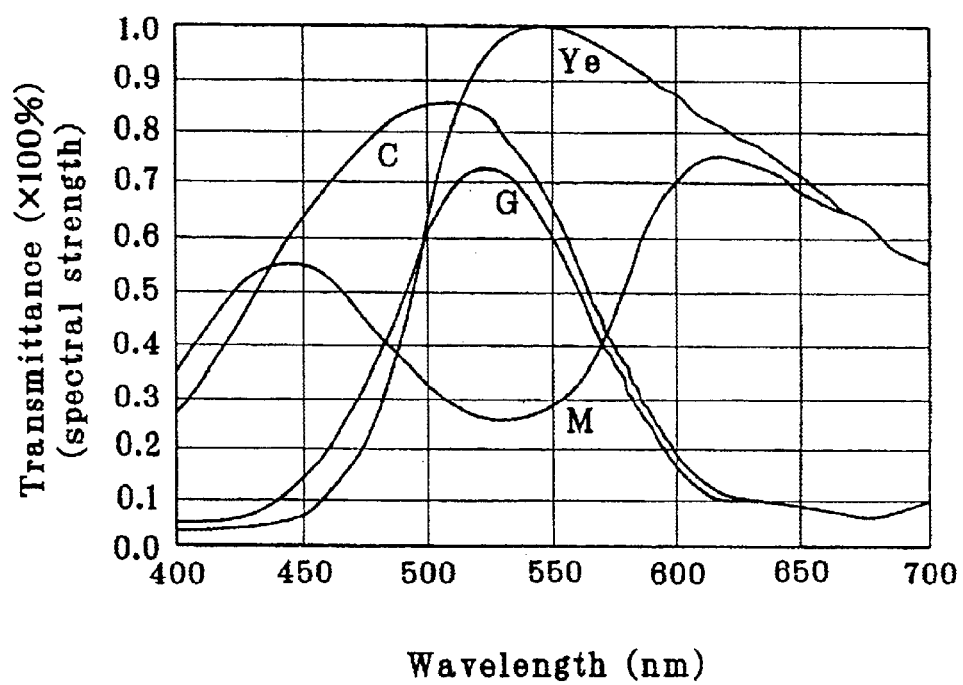
FIG. 14 is a diagram indicative of one example of the wavelength characteristics of the complementary colors mosaic filter.

One example of the wavelength characteristics in the aforesaid respective examples is shown in FIG. 14. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals,

Y=|G+M+$Y_e$+C|×¼

For chromatic signals,

R-Y=|(M+$Y_e$)-(G+C)|

B-Y=|(M+C)-(G+$Y_e$)|

Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters LF may be either two as mentioned above or one.

In what follows, some exemplary constructions of the variable-shape mirror that is herein used as the reflecting optical element for bending the optical path through the zoom optical system of the invention are now explained.

Figure 15:
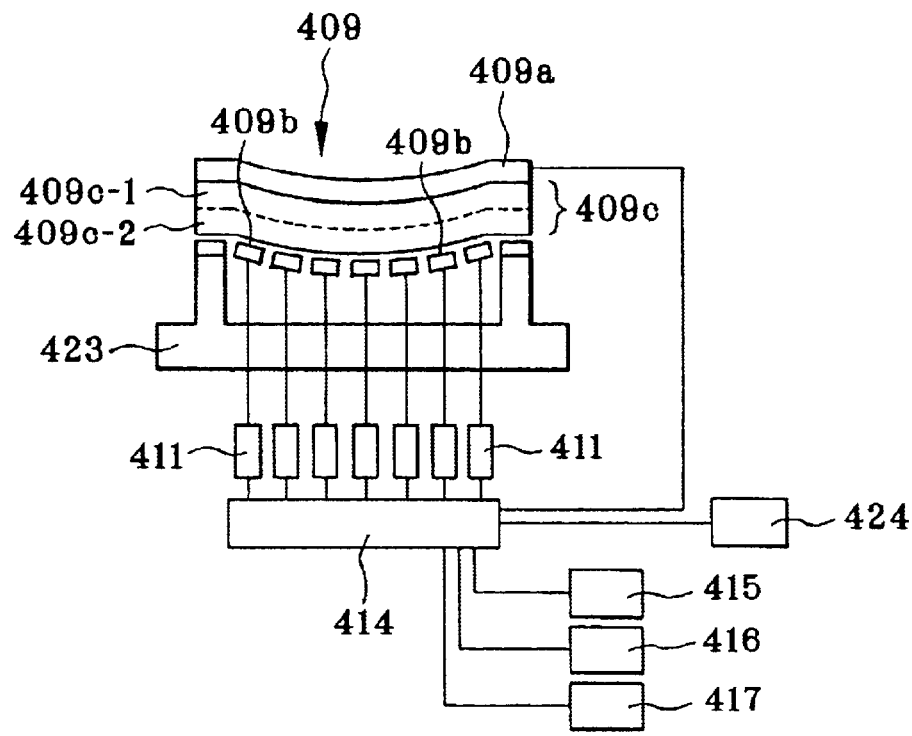
FIG. 15 is illustrative in schematic of one example of the variable-shape mirror usable as the reflecting optical element in the zoom optical system of the invention.

FIG. 15 is illustrative in schematic of one example of the shape variable mirror 409 that can be used as the reflecting optical element in the zoom lens of the invention.

The basic construction of the mirror 409 having variable optical properties is first explained.

First, the variable-shape mirror having variable optical properties, shown at 409, is explained.

The variable-shape mirror 409 having variable optical properties (hereinafter often called simply the variable-shape mirror) comprises a thin film (reflecting surface) 409a formed as by coating of aluminum and a plurality of electrodes 409b. Reference numeral 411 represents a plurality of variable resistors connected to the respective electrodes 409b; 414 is a computing unit for controlling the resistance values of a plurality of variable resistors 411; and 415, 416 and 417 are a temperature sensor, a humidity sensor and a distance sensor connected to the computing unit 414, respectively. These components are located as shown to construct a single optical apparatus.

It is here noted that the surface of the variable-shape mirror may be configured not only as planar surface but also as surfaces of many other shapes, e.g., spherical shape; rotationally symmetric aspheric shape; spherical shape, planar shape, and rotationally symmetric aspheric shape decentered with respect to the optical axis of the optical apparatus; aspheric shape having a symmetric surface; aspheric shape having only one symmetric surface; aspheric shape having no symmetric surface; free-form surface shape; and surface shape having an undifferentiable point or line. Moreover, these surfaces may be configured as reflecting or refracting surfaces. Moreover, any desired reflecting or refracting surface capable of producing some influences on light may be used in the invention. In what follows, these surfaces are generally called the "extended surface".

It is further preferable to control the shape of the reflecting surface of the variable-shape mirror in such a way as to have the form of a free-form surface because aberrations can be favorably corrected with ease.

The surface shape of such a free-form surface may be defined by formula (a) in U.S. Pat. No. 6,124,989 (JP-A 2000-66105).

Figure 16:
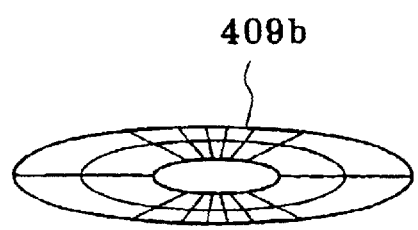
FIG. 16 is illustrative of one form of electrode used with the variable-shape mirror of FIG. 15.
Figure 17:
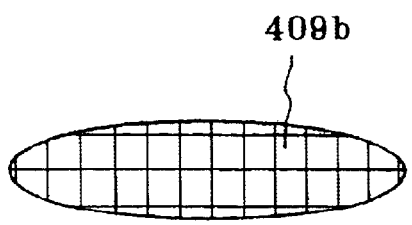
FIG. 17 is illustrative of another form of electrode used with the variable-shape mirror of FIG. 15.

In this variable-shape mirror as shown in FIG. 15, a piezoelectric element 409c is interposed between a thin film 409a and a plurality of electrodes 409b and the assembly is provided on a supporting member 423. By varying the voltage applied on the piezoelectric element 409c for each electrode 409b, the piezoelectric element 409c is elongated and contracted in partially different manners, thereby transforming the thin film 409a. The electrode array 409b may be concentrically divided as shown in FIG. 16 or rectangularly divided as shown in FIG. 17, or alternatively it may have other shape depending on the intended purpose. In FIG. 15, reference numeral 424 is a shake sensor connected to the computing unit 414. For instance, when a digital camera shakes, the sensor 424 actuates to sense that shake, thereby varying the voltage applied on the electrode array 409b via the computing unit 414 and variable resistors 411, so that the thin film (reflecting surface) 409a can be transformed for compensation for image blurring due to camera shake. At the same time, consideration is given to signals from the temperature sensor 415, humidity sensor 416 and distance sensor 417 for focusing, and compensation for temperature and humidity changes. Preferably in this case, some thickness and so some strength should be added to the thin film 409a because stresses in association with the transformation of the piezoelectric element 409c are applied on the thin film 409a.

Figure 18:
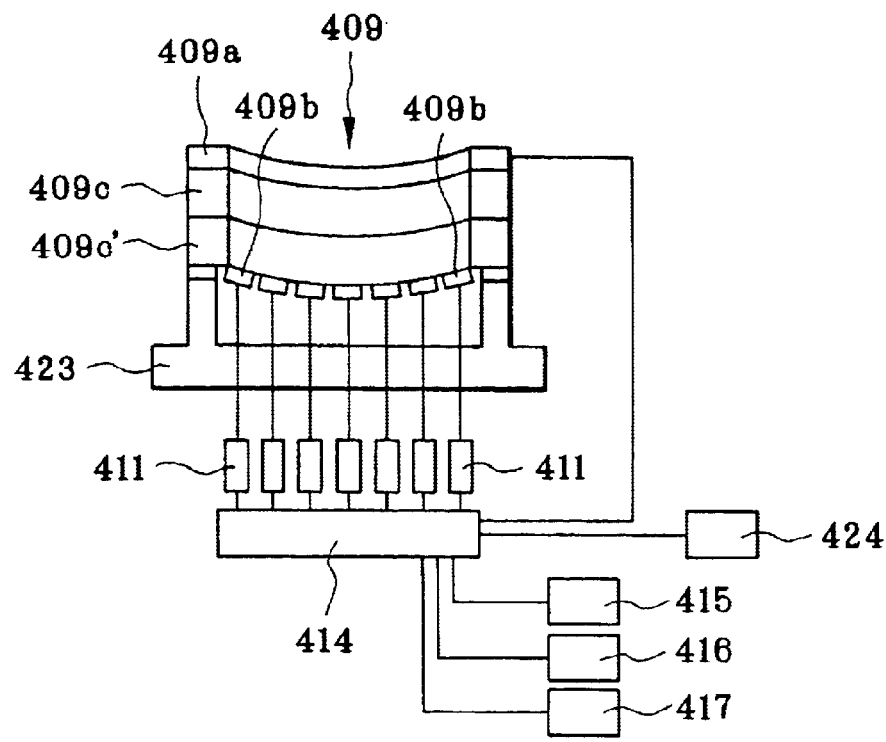
FIG. 18 is illustrative in schematic of another example of the variable-shape mirror usable as the reflecting optical element in the zoom optical system of the invention.

FIG. 18 is illustrative in schematic of another example of the variable-shape mirror 409 usable as the reflecting optical element in the zoom lens system of the invention.

This variable-shape mirror is different from the variable-shape mirror shown in FIG. 15 in that the piezoelectric element interposed between the thin film 409a and a plurality of electrodes 409b is made up of two piezoelectric elements 409c and 409c' formed of materials having piezoelectric properties in opposite directions. That is, when the piezoelectric elements 409c and 409c' are formed of ferroelectric crystals, they are located with the orientations of crystallographic axes being in opposite directions. In this case, since the piezoelectric elements 409c and 409c' are elongated and contracted in opposite directions upon receipt of voltages, the force that transforms the thin film 409a becomes stronger than that of the example of FIG. 15, resulting in large transformation of the mirror surface.

The piezoelectric element 409c, 409c', for instance, may be formed of piezoelectric materials such as barium titanate, Rochelle salt, quartz, tourmaline, potassium dihydrogenphosphate (KDP), ammonium dihydrogenphosphate (ADP) and lithium niobate, polycrystals and crystals thereof, solid-solution piezoelectric ceramics of $PbZrO_3$ and $PbTiO_3$, organic dielectric materials such as poly(vinyl difluoride) (PVDF), and ferroelectric materials other than the aforesaid materials, among which the organic piezoelectric materials are particularly preferred because of their low Young's modulus and because they can undergo large transformation even at low voltage. It is noted that if these piezoelectric elements are used at an uneven thickness, it is also possible to properly transform the thin film 409a in each of the aforesaid examples.

The piezoelectric element 409c, 409' may also be formed of polymer piezoelectric materials such as polyurethane, silicone rubber, acryl elastomer, PZT, PLZT, poly (vinylidene fluoride)(PVDF), copolymers such as vinylidene cyanide copolymers and copolymers of vinylidene fluoride and trifluoroethylene.

It is preferable to use organic materials having piezoelectricity, synthetic resins having piezoelectricity, elastomers having piezoelectricity, etc., because it is possible to largely transform the surface of a variable-shape mirror.

It is noted that when the piezoelectric element 409c of FIG. 15 or FIG. 18 is formed of an electrostrictive material such as an acryl elastomer or silicone rubber, it may be provided in the form of a double-layer structure wherein a layer of the piezoelectric element 409c is laminated on another substrate 409c-1 and electrostrictive material 409c-2.

Figure 19:
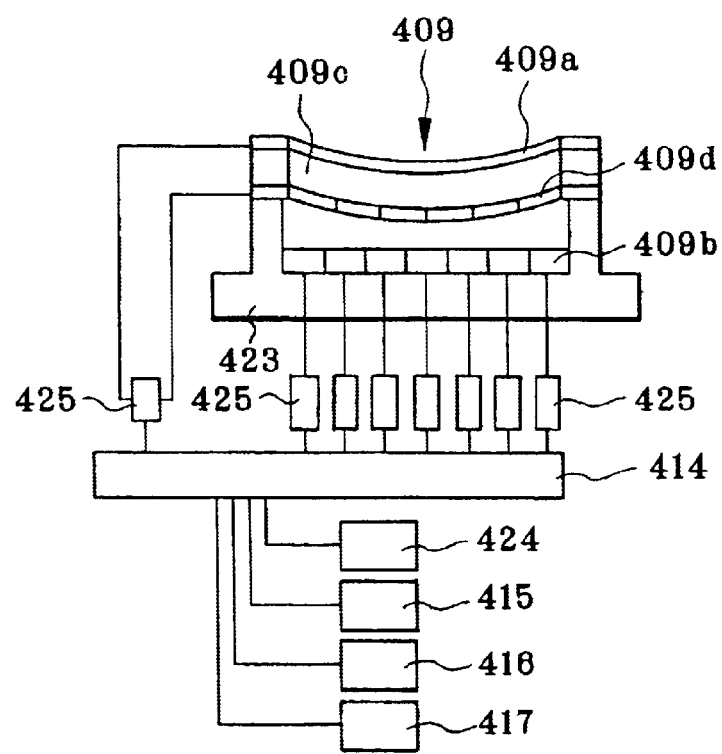
FIG. 19 is illustrative in schematic of yet another example of the variable-shape mirror usable as the reflecting optical element in the zoom optical system of the invention.

FIG. 19 is illustrative in schematic of yet another example of the variable-shape mirror 409 usable as the reflecting optical element in the zoom optical system of the invention.

In this variable-shape mirror, the piezoelectric element 409c is sandwiched between the thin film 409a and a plurality of electrodes 409d, and the assembly is provided on the supporting member 423. Then, voltage is applied on the piezoelectric element 409c between the thin film 409a and the electrodes 409d via the driving circuit 425 controlled by the computing unit 414. Besides, voltage is applied on a plurality of electrodes 409b provided on the supporting member 423 via the driving circuit 425b controlled by the computing unit 414. Accordingly, the thin film 409a can be subjected to double transformation by the voltage applied between the thin film 409a and the electrodes 409d and electrostatic force resulting from the voltage applied on the electrodes 409b, so that much more transformation patterns than could be achieved in any of the aforesaid examples can be obtained with faster responsibility.

By varying the sign of the voltage between the thin film 409a and the electrodes 409d, it is possible to transform the variable-shape mirror into either convex shape or concave shape. In this case, it is acceptable to achieve large transformation using the piezoelectric effect and minute transformation using electrostatic force. It is also acceptable to use mainly the piezoelectric effect for convex transformation and mainly electrostatic force for concave transformation. It is noted that the electrode 409d may be constructed using a plurality of electrodes as is the case with the electrodes 409b. How the electrode 409d is constructed using a plurality of electrodes is illustrated in FIG. 19. It is understood that the term "piezoelectric effect" used herein includes not only the piezoelectric effect but the electrostrictive effect as well, and the piezoelectric material is understood to include the electrostrictive material, too.

Figure 20:
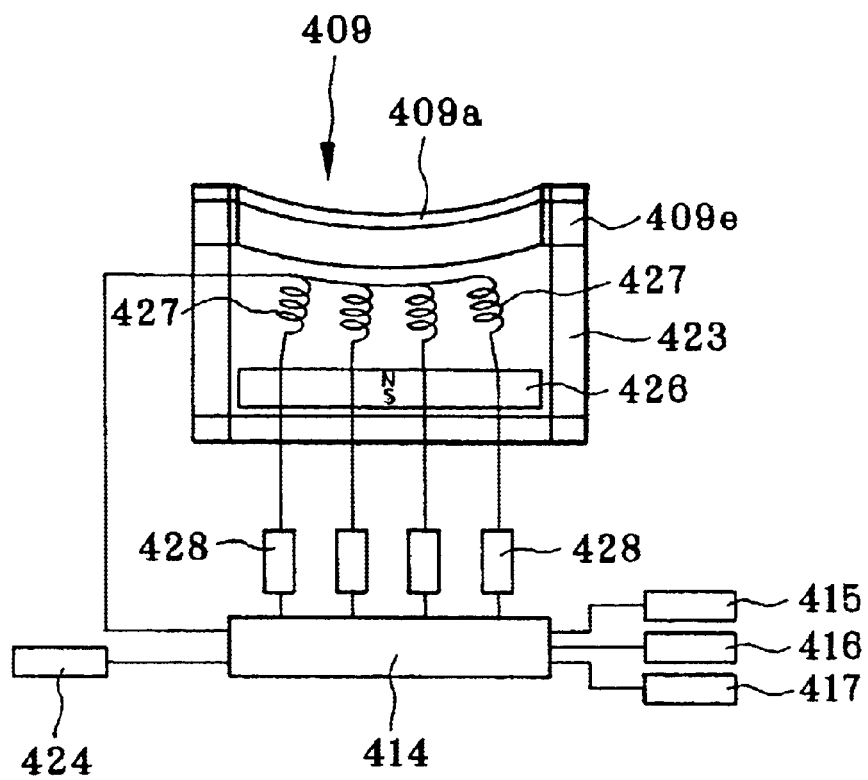
FIG. 20 is illustrative in schematic of a further example of the variable-shape mirror usable as the reflecting optical element in the zoom optical system of the invention.

FIG. 20 is illustrative in schematic of yet another example of the variable-shape mirror 409 usable as the reflecting optical element in the zoom optical system of the invention.

This variable-shape mirror is designed such that the reflecting surface can be transformed by making use of electromagnetic force. The permanent magnet 426 is fixed on the inside bottom of the support frame 423, and the peripheral portion of the substrate 409e formed of silicon nitride, polyimide or the like is fixedly placed on top of that frame. In addition, the thin film 409a formed of an aluminum or other metal coat is provided on the surface of the substrate 409e, so that the variable-shape mirror 409 is set up. The substrate 409e is fixedly provided on its lower surface with a plurality of coils 427 that are then connected to the computing unit 414 via the respective driving circuits 428. In response to output signals from the computing unit 414, which correspond to changes in the optical system which changes are determined in the computing unit 414 by signals from the respective sensors 415, 416, 417 and 424, suitable currents are fed to the respective coils 427 through the respective driving circuits 428, whereupon the respective coils 427 are repulsed or adsorbed by electromagnetic force exerted between them and the permanent magnet 426, so that the substrate 409e and thin film 409a can be transformed.

In this case, it is acceptable to pass varying amounts of currents through the respective coils 427, or use a single coil 427. Alternatively, the permanent magnet 426 may be provided on the substrate 409e while the coils 427 may be provided on the inside bottom of the support frame 423. Preferably, the coils 427 should be designed as by lithography. The coils 427 may also have therein cores formed of ferromagnetic materials.

Figure 21:
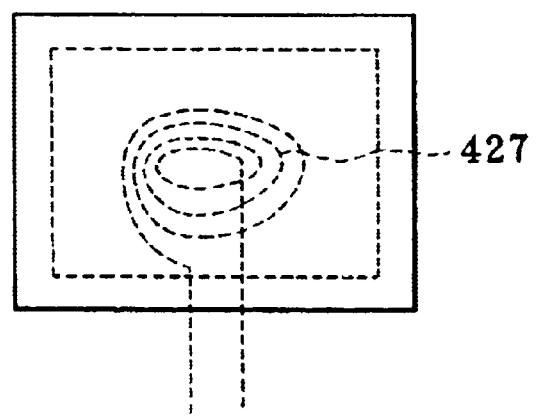
FIG. 21 is illustrative of the turn density of the thin-film coil shown in FIG. 20.

The thin-film coil 427 may also be designed in such a way as to have a turn density that varies depending on the site of the substrate 409*e*, as is the case of such a coil 428' as shown in FIG. 21, thereby imparting the desired transformation to the substrate 409*e* and thin-film 409*a*. The coils 427 may each have therein a core of ferromagnetic material.

Figure 22:
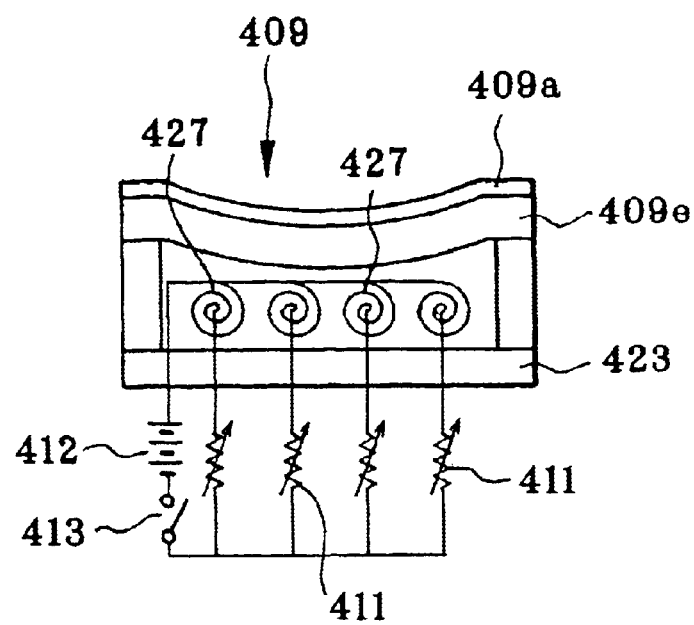
FIG. 22 is illustrative in schematic of a further example of the variable-shape mirror usable as the reflecting optical element in the zoom optical system of the invention.

FIG. 22 is illustrative in schematic of a further example of the variable-shape mirror 409 usable as the reflecting optical element in the zoom optical system of the invention. Reference numeral 412 is a power source.

Figure 23:
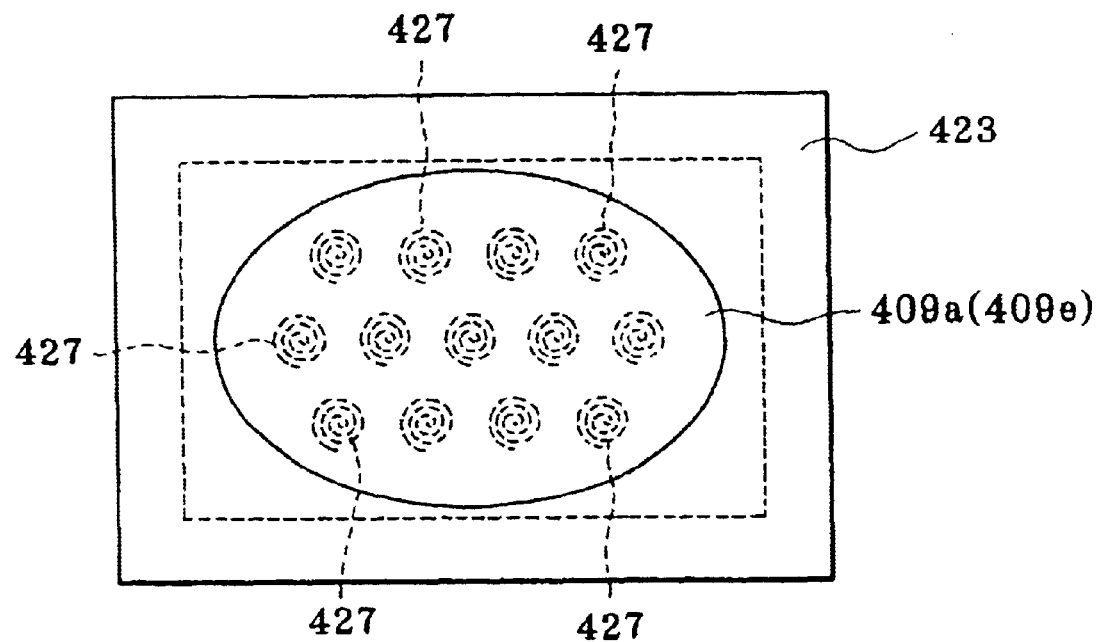
FIG. 23 is illustrative of one example of how the coil of FIG. 22 is provided.
Figure 24:
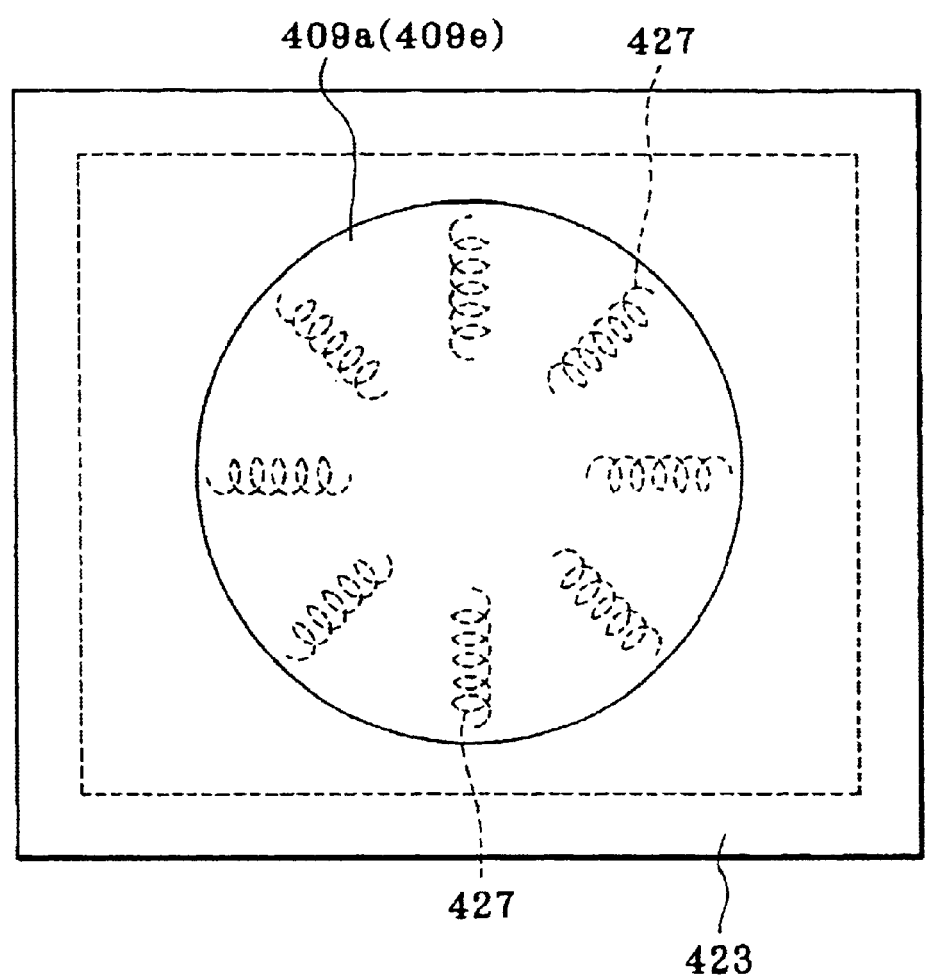
FIG. 24 is illustrative of another example of how the coil of FIG. 22 is provided.
Figure 25:
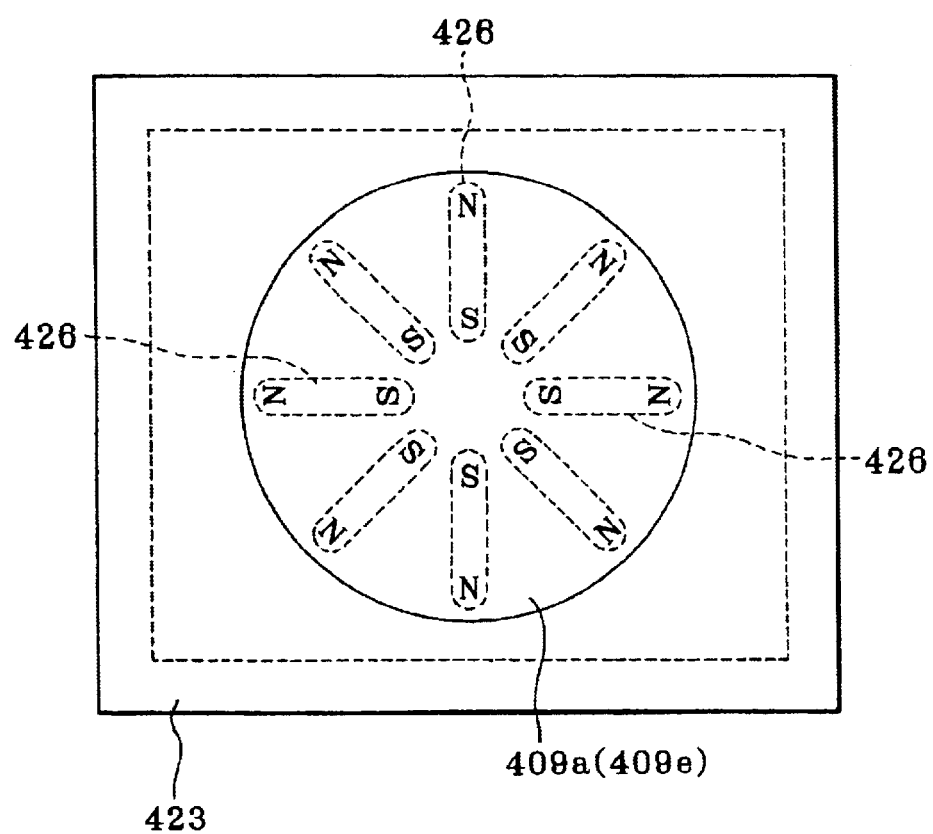
FIG. 25 is illustrative of one exemplary arrangement of permanent magnets fit for the case where the thin-film coil of FIG. 22 is provided as shown in FIG. 24.

In this variable-shape mirror, the substrate 409*e* is formed of iron or other ferromagnetic material, and the thin film 409*a* functioning as a reflecting film is formed of aluminum or the like. In this case, since it is unnecessary to provide the thin-film coils, the variable-shape mirror can be simplified in construction and so can be fabricated at low costs. If the power source switch 413 is replaced by a combined changeover and open/close switch, the directions of currents passing through the coils 427 can be so changed that the shape of the substrate 409*e* and thin film 409*a* can be changed without restraint. FIG. 23 shows one example of how the coils 427 is located in this example, and FIG. 24 shows another example of locating the coils 427. These locations may also be applied to the example of FIG. 20. FIG. 25 illustrates the locations of the permanent magnets 426 well fit for the case where the coils 427 are located as shown in FIG. 24. That is, if the permanent magnets 426 are located as shown in FIG. 25, more delicate transformation than could be achieved in the example of FIG. 20 can then be imparted to the substrate 409*e* and thin film 409*a*. Such transformation of the substrate 409*e* and thin film 409*a* by electromagnetic force (the examples of FIGS. 20 and 22) has a merit over transformation by electrostatic force in that the driving voltage can be much more reduced.

The present invention has been described with reference to some examples of the variable-shape mirror. For transformation of the mirror formed of a thin film, however, it is acceptable to make use of two or more forces, as exemplified in FIG. 19. In short, it is acceptable to transform the variable-shape mirror by simultaneous use of at least two of electrostatic force, electromagnetic force, piezoelectric effect, electrostriction, fluid pressure, magnetic field, temperature change, electromagnetic waves, etc. That is, if an optical element having variable optical properties is fabricated with two or more different driving methods, large transformation and fine transformation are then achievable at the same time and, hence, a mirror surface with satisfactory precision is achievable.

The present zoom lens constructed as described above may be applied to phototaking systems where object images formed through zoom lenses are received at image pickup devices such as CCDs, inter alia, digital cameras or video cameras as well as PCs and telephone sets which are typical information processors, in particular, easy-to-carry cellular phones. Given below are some such embodiments.

Figure 26:
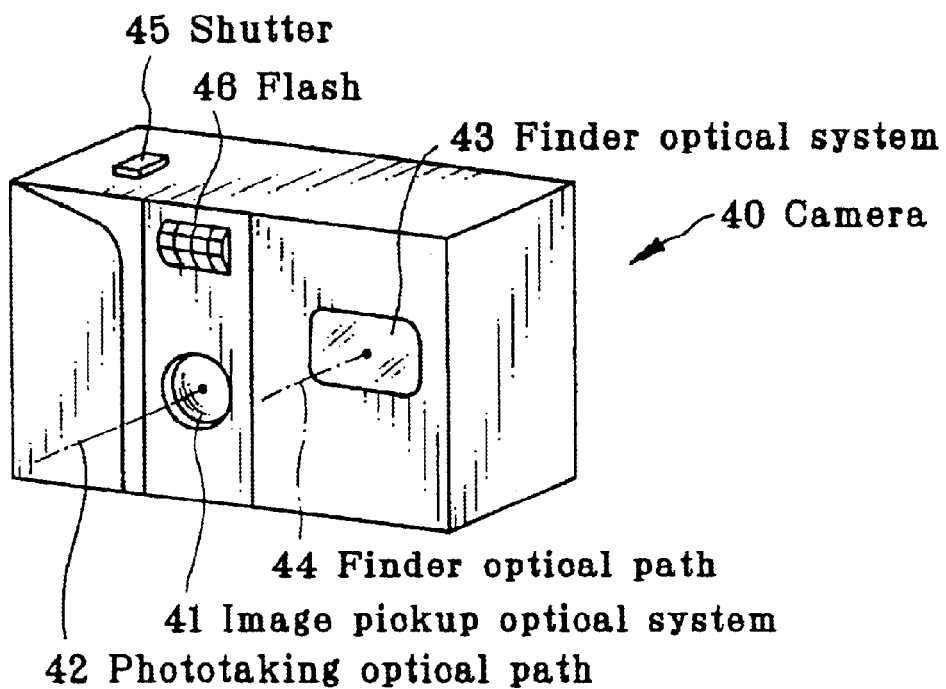
FIG. 26 is a front perspective schematic illustrative of the outside shape of a digital camera with the inventive optical path-bending zoom optical system built therein.
Figure 27:
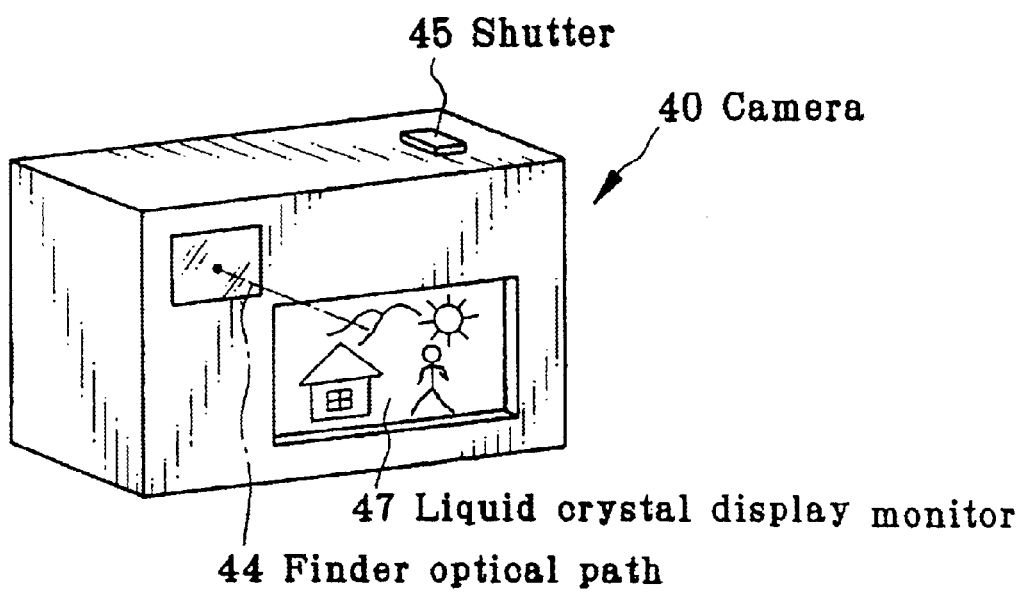
FIG. 27 is a rear perspective schematic of the digital camera of FIG. 26.
Figure 28:
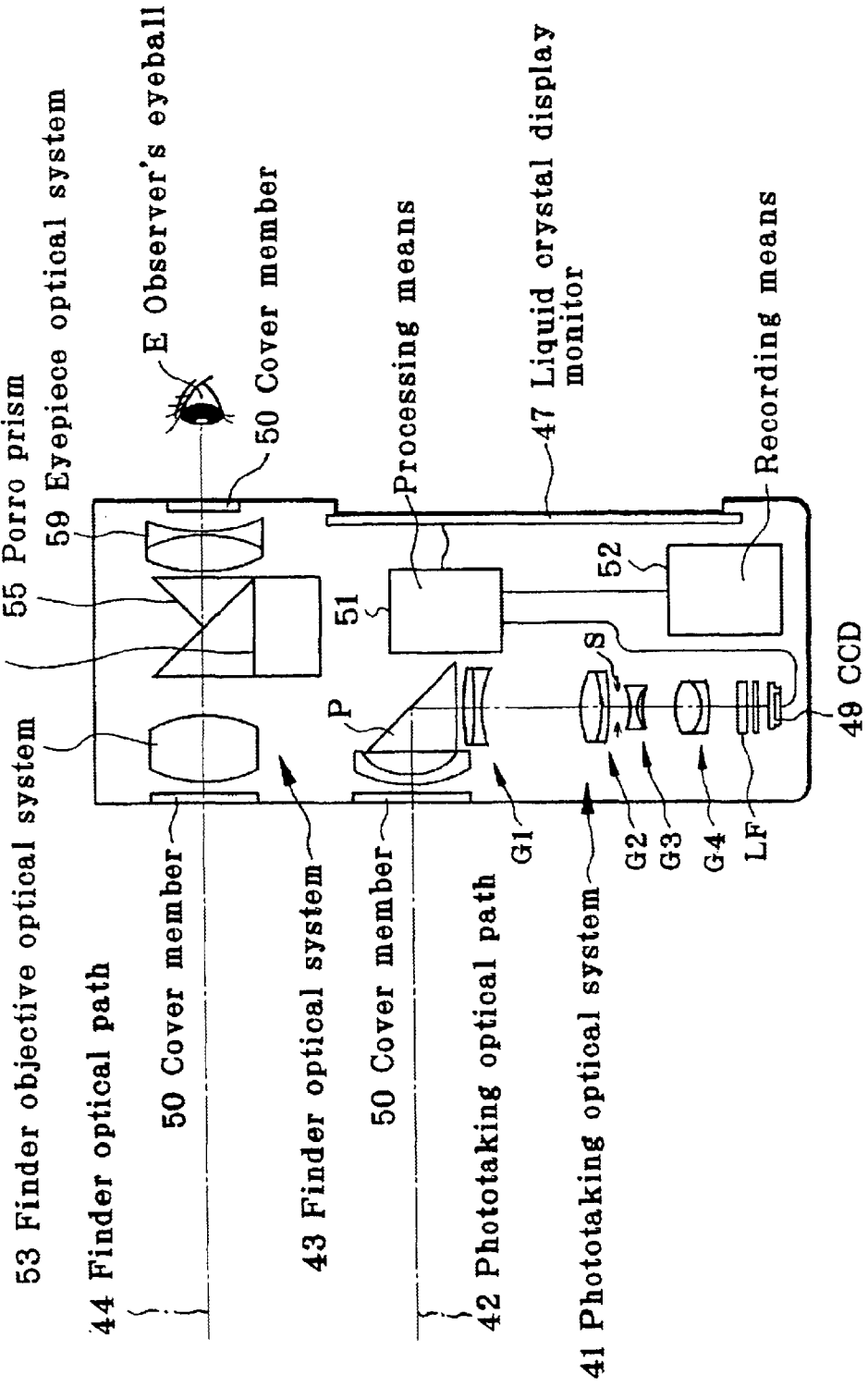
FIG. 28 is a sectional schematic of the digital camera of FIG. 26.

FIGS. 26, 27 and 28 are conceptual illustrations of a phototaking optical system 41 for digital cameras, in which the zoom lens of the invention is built. FIG. 26 is a front perspective view of the outside shape of a digital camera 40, and FIG. 27 is a rear perspective view of the same. FIG. 28 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the optical path-bending zoom lens according to Example 1. An object image formed by the phototaking optical system 41 is formed on the image pickup plane of a CCD 49 via a near-infrared cut filter and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide camera in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 28, plane-parallel plates are used as the cover members 50; however, it is acceptable to use powered lenses.

Figure 29:
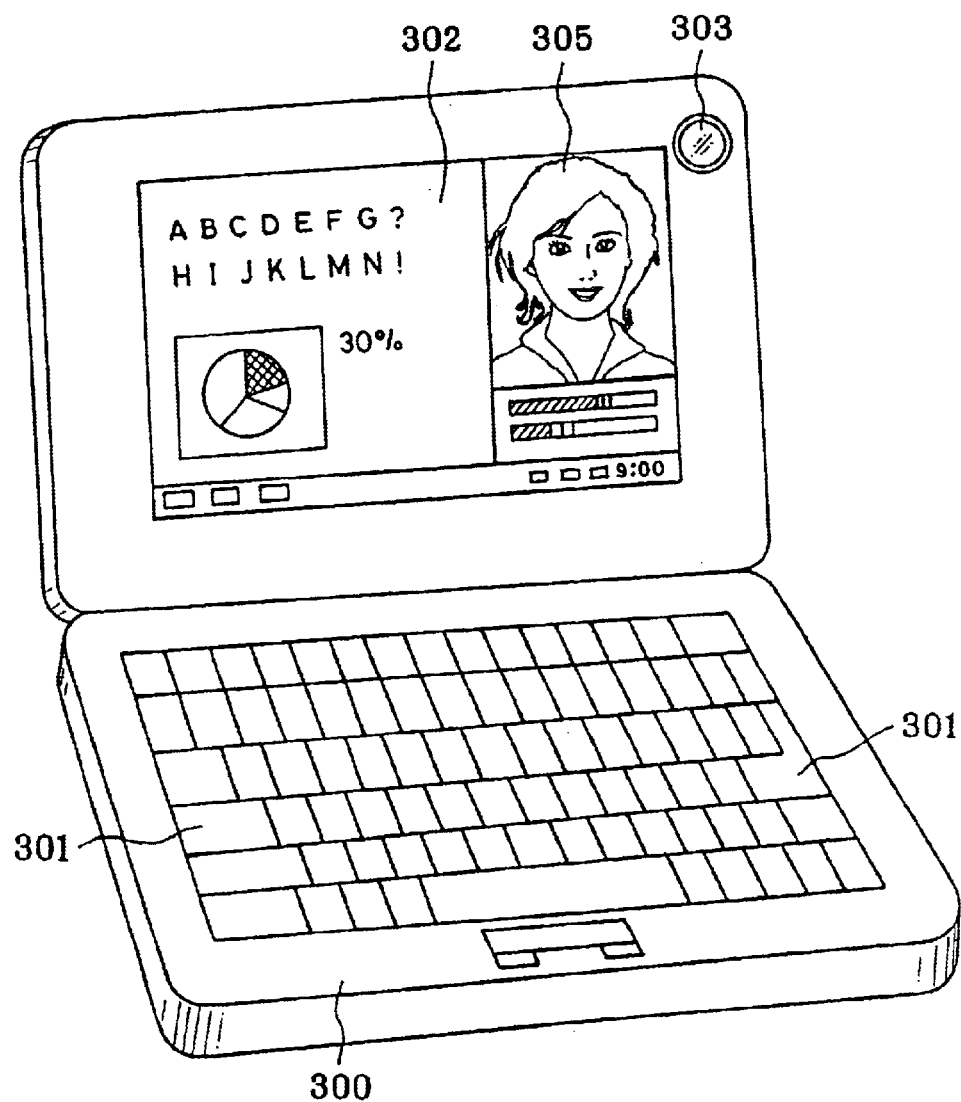
FIG. 29 is a front perspective view of a personal computer in use, in which the inventive optical path-bending zoom optical system is incorporated in the form of an objective optical system.
Figure 30:
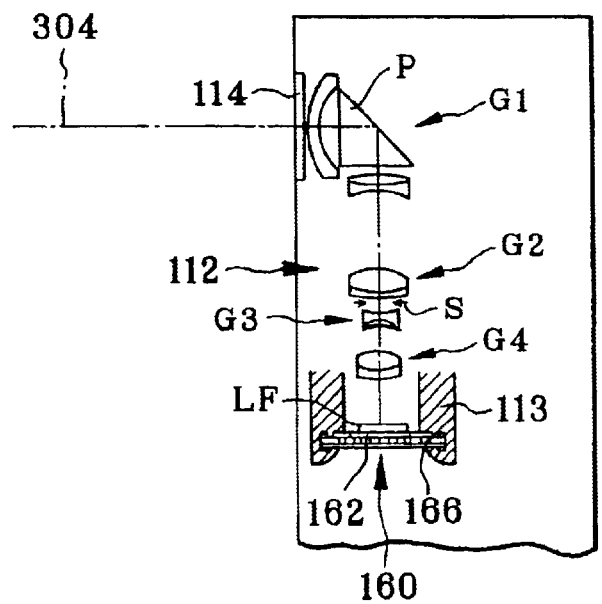
FIG. 30 is a sectional view of the phototaking optical system in the personal computer.
Figure 31:
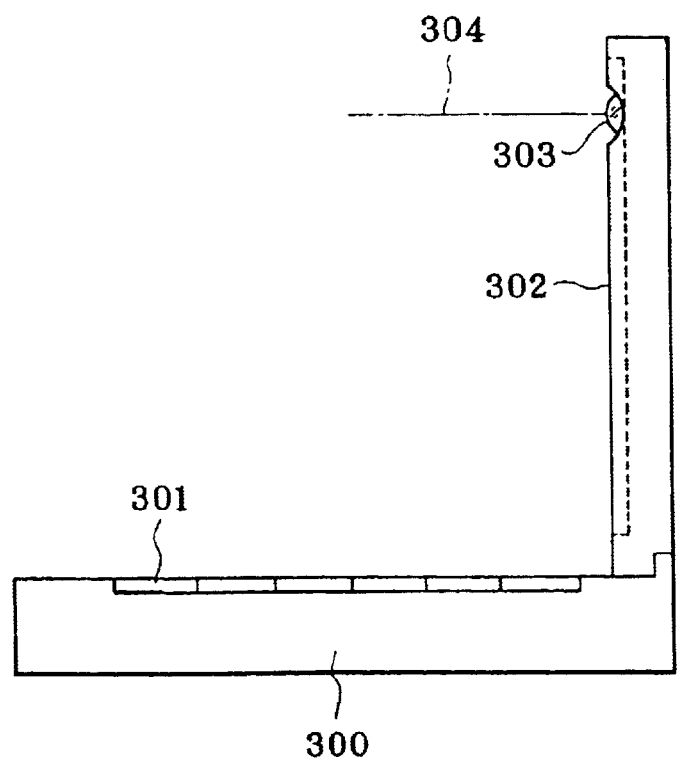

FIGS. 29, 30 and 31 are illustrative of a personal computer that is one example of the information processor in which the zoom lens of the invention is built as an objective optical system. FIG. 29 is a front perspective view of a personal computer 300 in use, FIG. 30 is a sectional view of a phototaking optical system 303 in the personal computer 300, and FIG. 31 is a side view of the state of FIG. 29. As shown in FIGS. 29-31, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right upper portion of the monitor 302, it may be located somewhere around the monitor 302 or keyboard 301.

This phototaking optical system 303 comprises, on a phototaking optical path 304, an objective lens 112 comprising the optical path-bending zoom lens of Example 1 and an image pickup device chip 162 for receiving an image. These are built in the personal computer 300.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in the processing means of the personal computer 300, and shown as an electronic image on the monitor 302. As an example, an image 305 taken of the operator is shown in FIG. 41. This image 305 may be shown on a personal computer on the other end via suitable processing means and the Internet or telephone line.

Figure 32A:
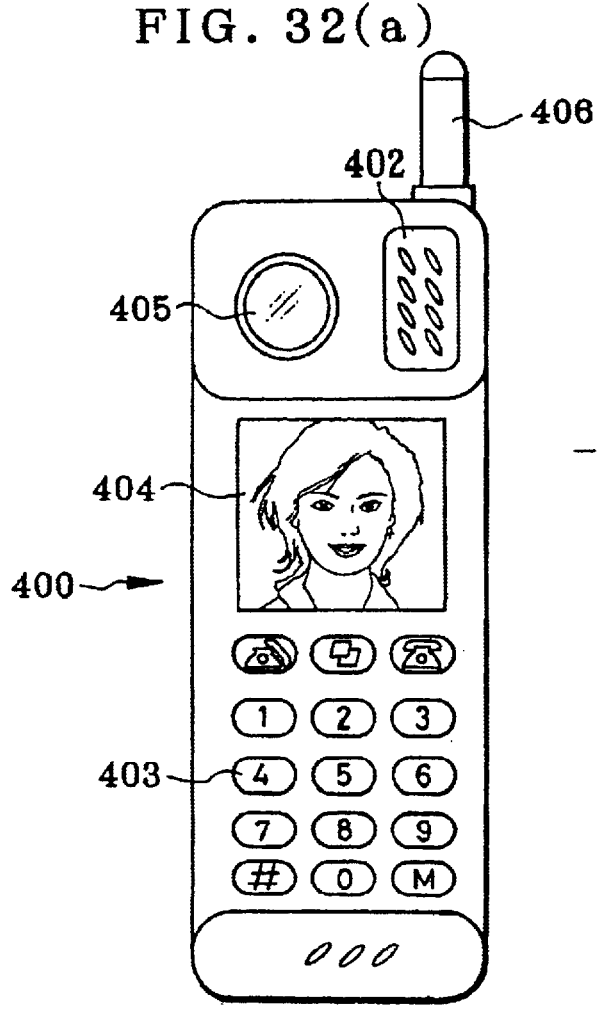
FIGS. 32(a) and 32(b) are a front and a side view of the cellular phone in which the inventive optical path-bending zoom optical system is incorporated in the form of an objective optical system.
Figure 32B:
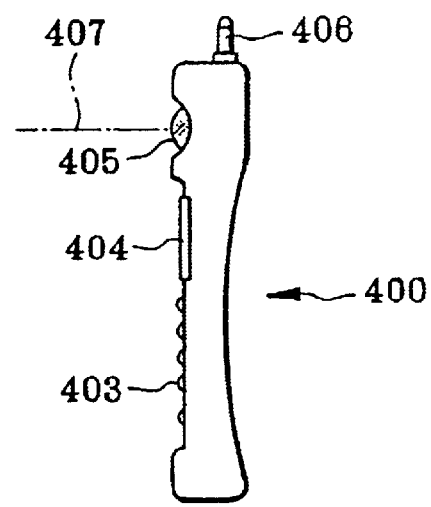
Figure 32C:
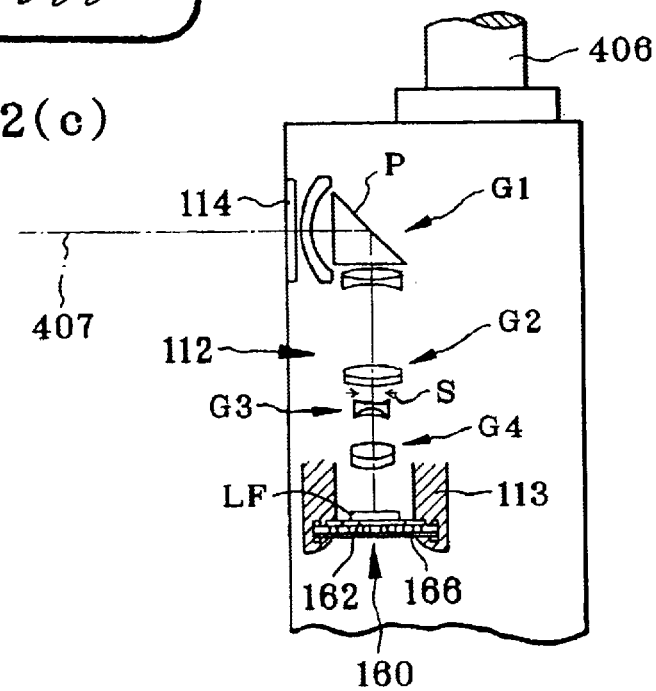
FIG. 32(c) is a sectional view of the phototaking optical system therein.

FIGS. 32(*a*), 32(*b*) and 32(*c*) are illustrative of a telephone set that is one example of the information processor in which the zoom lens of the invention is built in the form of a phototaking optical system, especially a convenient-to-carry cellular phone. FIG. 32(*a*) and FIG. 32(*b*) are a front and a side view of a cellular phone 400, respectively, and FIG. 32(*c*) is a sectional view of a phototaking optical system 405. As shown in FIGS. 32(*a*), 32(*b*) and 32(*c*), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the optical path-bending zoom lens of Example 1 and an image pickup device chip 162 for receiving an object image. These are built in the cellular phone 400.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

The present invention provides an arrangement wherein a reflecting optical element such as a mirror is inserted on an object side to bend an optical path (optical axis) through an optical system, especially a zoom lens system with some contrivances. It is thus possible to achieve a camera that, while considerably high optical specification performances such as high zoom ratio, wide-angle arrangement, small F-number and limited aberrations are ensured, takes no time for start-up unlike a collapsible lens mount system, is preferable for resistance to water and dust, and is extremely reduced in terms of depth dimensions. In addition, the stop, shutter mechanism, etc. remain immovable with respect to position, so that the depth dimensions of the camera can be much more reduced.

What we claim is:

1. A zoom lens comprising, in order from an object side thereof, a lens group A that includes a negative lens and a reflecting optical element for bending an optical path and remains fixed upon zooming, a lens group B that moves in one direction alone upon zooming from a wide-angle end to a telephoto end of the zoom lens, and an aperture stop that remains immovable with respect to position upon zooming, wherein condition (1) is satisfied:

$$0.45 < \log \gamma_B / \log \gamma < 0.85 \qquad (1)$$

where $\gamma = f_T/f_W$, and $\gamma_B$ is a magnification of the lens group B at the telephoto end/a magnification of the lens group B at the wide-angle end, provided that $f_W$ and $f_T$ are focal lengths of the zoom lens at the wide-angle end and the telephoto end, respectively.

2. The zoom lens according to claim 1, wherein the lens group A comprises a negative lens on the object side with respect to the reflecting optical element.

3. The zoom lens according to claim 1, which further comprises a lens group on an image side of the zoom lens with respect to the aperture stop that, upon zooming from the wide-angle end to the telephoto end, moves in one direction alone.

4. A zoom lens comprising, in order from an object side thereof, a lens group A that has negative refracting power and remains fixed upon zooming, a lens group B that has positive refracting power and moves upon zooming, and an aperture stop that remains immovable with respect to position upon zooming, wherein condition (1) is satisfied:

$$0.45 < \log \gamma_B / \log \gamma < 0.85 \qquad (1)$$

where $\gamma = f_T/f_W$, and $\gamma_B$ is a magnification of the lens group B at a telephoto end/a magnification of the lens group B at a wide-angle end, provided that $f_W$ and $f_T$ are focal lengths of the zoom lens at the wide-angle end and the telephoto end, respectively.

5. The zoom lens according to claim 4, which further comprises a lens group C having negative refracting power and a lens group D having positive refracting power in order from the aperture stop toward an image side of the zoom lens, wherein, upon zooming from a wide-angle end to a telephoto end of the zoom lens, at least one lens group moves toward only an image side of the zoom lens.

6. The zoom lens according to claim 4, wherein the lens group A further comprises a reflecting optical element for bending an optical path, and the lens group B moves toward the object side alone upon zooming from the wide-angle end to the telephoto end.

7. The zoom lens according to claim 1, wherein the lens group A comprises a subgroup A1 comprising a negative meniscus lens convex on an object side thereof, a reflecting optical element for bending an optical path mid a subgroup A2 comprising at least positive lens.

8. The zoom lens according to claim 1, which further comprises lens groups on an image side of the zoom lens with respect to the aperture stop, wherein focusing is performed with any of the lens groups located on the image side.

9. The zoom lens according to claim 1, which further comprises lens groups having positive refracting power, all of which have aspheric surfaces.

10. The zoom lens according to claim 1, which further comprises lens groups having positive refracting power, all of which include cemented lens components.

11. The zoom lens according to claim 1, which further comprises lens group having positive refracting power, which are each formed of one cemented lens component.

12. The zoom lens according to claim 1, wherein the reflecting optical element for bending an optical path is formed of a prism block that satisfies the following medium condition:

$$1.55 < npri < 1.97 \quad (2)$$

where npri is a d-line refractive index of a medium that forms the prism block.

13. The zoom lens according to claim 12, wherein the prism block satisfies the following condition:

$$0.5 < d/L < 1.2 \quad (3)$$

wherein d is a distance from an entrance surface to an exit surface of the prism block as measured along the optical path and calculated on an air basis, and L is a diagonal length of an effective image pickup area of an image pickup device.

14. The zoom lens according to claim 4, wherein a composite magnification of the group B and subsequent lens groups at the telephoto end satisfies the following condition:

$$0.75 < -\beta_{Rt} < 1.5 \quad (4)$$

wherein $\beta_{Rt}$ is a composite magnification (on infinite object point) of the lens group B and the subsequent lens groups.

15. The zoom lens according to claim 5, wherein amounts of movement of the lens groups upon zooming from the wide-angle end to the telephoto end when focused at infinity satisfies the following condition:

$$-0.3 < M_1/M_2 < 0.3 \quad (5)$$

wherein $M_2$ is an amount of movement of the lens group B and $M_1$ is an amount of movement of the lens group C.

16. The zoom lens according to claim 5, wherein amounts of movement of lens groups upon zooming from the wide-angle end to the telephoto when focused at infinity satisfies the following condition:

$$0.3 < M_4/M_3 < 0.9 \quad (6)$$

wherein $M_3$ is an amount of movement of the lens group C and $M_4$ is an amount of the lens group D.

17. The zoom lens according to claim 7, wherein the subgroup A2 in the lens group A consists of two lens components, i.e., a positive lens component and a negative lens component in order from the object side, and satisfies the following condition:

$$-0.3 < L/f_{12} < 0 \quad (7)$$

wherein $f_{12}$ is a focal length of the subgroup A2 in the lens group A and L is a diagonal length of an effective image pickup area of an image pickup device.

18. The zoom lens according to claim 7, wherein the lens group A satisfies the following conditions:

$$0.5 < (R_{11F} + R_{11R}) < 4.5 \quad (8)$$

$$0 < f_{11}/f_{12} < 0.8 \quad (9)$$

wherein $R_{11F}$ and $R_{11R}$ are axial radii of curvature of an object side-surface and an image side-surface of the negative lens in the subgroups A1 in the lens group A, respectively, and $f_{11}$ and $f_{12}$ are focal lengths of the subgroups A1 and A2 in the lens group A, respectively.

19. The zoom lens according to claim 1, wherein the reflecting optical element for bending an optical path comprises a variable-shape mirror with controllable shape.

20. An electronic imaging system comprising a zoom lens as recited in claim 1 and an electronic image pickup device located on an image side thereof.

* * * * *